United States Patent
Gune et al.

(10) Patent No.: US 12,488,610 B2
(45) Date of Patent: Dec. 2, 2025

(54) RASTER IMAGE DIGITIZATION SYSTEM FOR FIELD DATA

(71) Applicant: Schlumberger Technology Corporation, Sugar Land, TX (US)

(72) Inventors: Omkar Anil Gune, Pune (IN); Purnaprajna Raghavendra Mangsuli, Pune (IN); Atul Laxman Katole, Bangalore (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 253 days.

(21) Appl. No.: 18/146,633

(22) Filed: Dec. 27, 2022

(65) Prior Publication Data
US 2024/0212384 A1   Jun. 27, 2024

(51) Int. Cl.
*G06V 30/42* (2022.01)
*G06V 10/774* (2022.01)
(Continued)

(52) U.S. Cl.
CPC ............ *G06V 30/42* (2022.01); *G06V 10/774* (2022.01); *G06V 10/776* (2022.01); *G06V 30/10* (2022.01); *G06V 30/414* (2022.01)

(58) Field of Classification Search
CPC ...... G06V 30/42; G06V 30/10; G06V 10/774; G06V 10/776; G06V 30/414; G06V 30/1444; G06V 30/1468; G06V 30/19127; G06V 10/7753; G06V 10/809; G06V 10/84; G06V 10/7715; G06V 30/19107; G06V 30/248; G06V 30/2504; G06V 30/41; G06V 30/412; G06V 30/416; G06V 10/98; G06V 1/40
See application file for complete search history.

(56) References Cited

U.S. PATENT DOCUMENTS 5,418,864 A * 5/1995 Murdock .............. G06F 18/254
  382/229
10,095,984 B1 * 10/2018 Venter ................. G06F 16/9024
(Continued)

FOREIGN PATENT DOCUMENTS

WO    WO-2021178412 A1 * 9/2021 ........... G06V 30/413

OTHER PUBLICATIONS

Laxman Katole A, Mangsuli P, Gune O, Saood Shakeel M, Neelakanteswara A, Abubakar A. Deep learning-based raster digitization engine. InSecond International Meeting for Applied Geoscience & Energy Aug. 15, 2022 (pp. 1624-1628). (Year: 2022).*
(Continued)

*Primary Examiner* — Oneal R Mistry
*Assistant Examiner* — Duy Tran
(74) *Attorney, Agent, or Firm* — Jeffrey D. Frantz

(57) ABSTRACT

A method can include receiving raster images of logs, where the logs include plots, tracks and headers and where, compared to the plots and the tracks, the headers are underrepresented; processing the raster images using a trained machine learning model to generate segmentation masks for the logs for identification of the plots, the tracks and the headers; and generating digitized versions of the logs using the segmentation masks, where each of the digitized versions of the logs includes a digitized plot with an associated digitized header and an associated digitized track.

20 Claims, 22 Drawing Sheets

(51) Int. Cl.
*G06V 10/776* (2022.01)
*G06V 30/10* (2022.01)
*G06V 30/414* (2022.01)

(56) References Cited

U.S. PATENT DOCUMENTS

| | | | | |
|---|---|---|---|---|
| 11,087,081 | B1* | 8/2021 | Srivastava | G06F 40/169 |
| 2007/0010947 | A1* | 1/2007 | Ireland | G01V 1/40 |
| | | | | 702/6 |
| 2017/0108614 | A1* | 4/2017 | Neave | G01V 1/48 |
| 2021/0065881 | A1* | 3/2021 | Sargent | G16H 30/40 |

OTHER PUBLICATIONS

Ghiasi, Golnaz, et al. "Simple Copy-Paste is a Strong Data Augmentation Method for Instance Segmentation." Proceedings of the IEEE/CVF Conference on Computer Vision and Pattern Recognition, 2021, pp. 2917-2927.

Isola, Phillip, Jun-Yan Zhu, Tinghui Zhou, and Alexei A. Efros. "Image-to-Image Translation with Conditional Adversarial Networks." In Proceedings of the IEEE Conference on Computer Vision and Pattern Recognition, pp. 5967-5976, 2017.

Nasim, M. Q. et al., "Digitization of Raster Logs: A Deep Learning Approach", arXiv:2210.05597v1, ARXIV.org, Cornell University Library, 2022, 18 pages.

Li, Z. et al., "Semi-supervised learning for lithology identification using Laplacian support vector machine", Journal of Petroleum Science and Engineering, 2020, 195, 13 pages.

Katole, A. L. et al., "Deep learning-based raster digitization engine", Second International Meeting for Applied Geoscience Engineering, 2022, 5 pages.

Extended Search Report issued in European Patent Application No. 23220409.9 dated May 14, 2022, 8 pages.

* cited by examiner

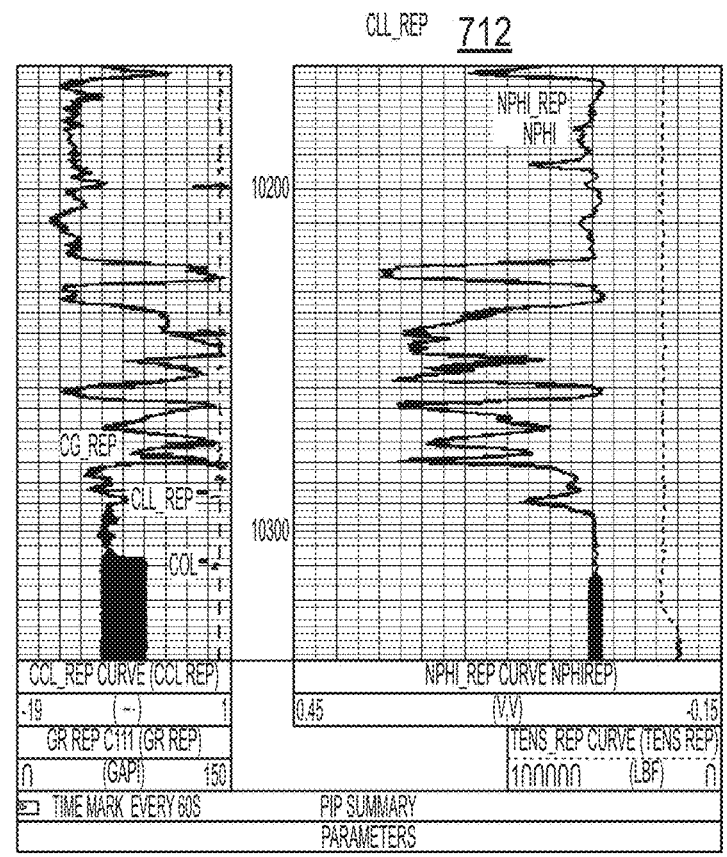
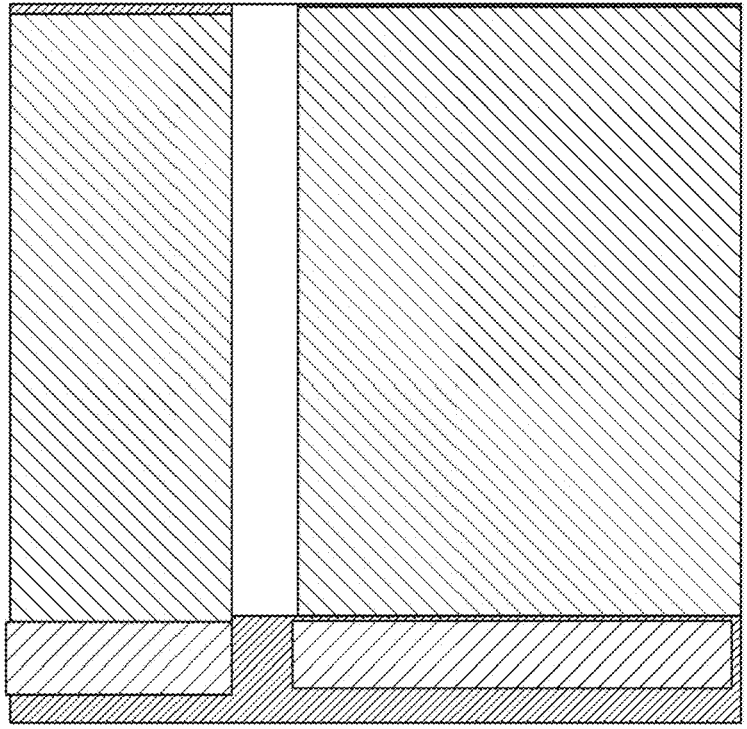
FIG. 7

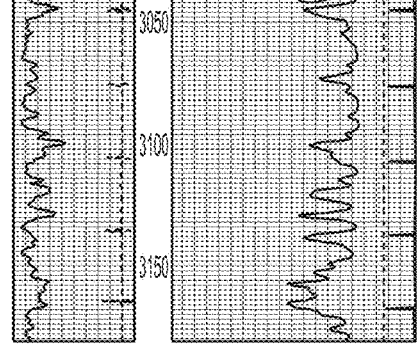
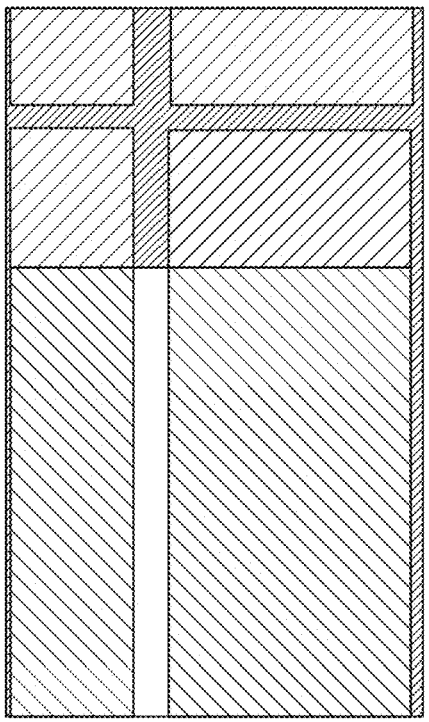
FIG. 7
(Continued)

Method 1900

Receive raster images of logs, where the logs include plots, tracks and headers and where, compared to the plots and the tracks, the headers are underrepresented
1910

CRM 1911

Process the raster images using a trained machine learning model to generate segmentation masks for the logs for identification of the plots, the tracks and the headers
1920

CRM 1921

Generate digitized versions of the logs using the segmentation masks, where each of the digitized versions of the logs includes a digitized plot with an associated digitized header and an associated digitized track
1930

CRM 1931

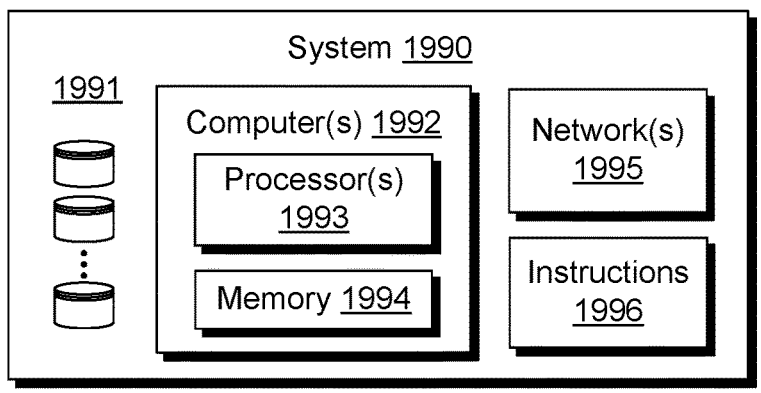

Fig. 19

RASTER IMAGE DIGITIZATION SYSTEM FOR FIELD DATA

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations. In such an example, control may be based at least in part on characteristics of rock where drilling into such rock forms a borehole that can be completed to form a well to produce from a reservoir and/or to inject fluid into a reservoir. While hydrocarbon fluid reservoirs are mentioned as an example, a reservoir that includes water and brine may be assessed, for example, for one or more purposes such as, for example, carbon storage (e.g., sequestration), water production or storage, geothermal production or storage, metallic extraction from brine, etc.

SUMMARY

A method can include receiving raster images of logs, where the logs include plots, tracks and headers and where, compared to the plots and the tracks, the headers are underrepresented; processing the raster images using a trained machine learning model to generate segmentation masks for the logs for identification of the plots, the tracks and the headers; and generating digitized versions of the logs using the segmentation masks, where each of the digitized versions of the logs includes a digitized plot with an associated digitized header and an associated digitized track. A system can include one or more processors; memory accessible to at least one of the one or more processors; processor-executable instructions stored in the memory and executable to instruct the system to: receive raster images of logs, where the logs include plots, tracks and headers and where, compared to the plots and the tracks, the headers are underrepresented; process the raster images using a trained machine learning model to generate segmentation masks for the logs for identification of the plots, the tracks and the headers; and generate digitized versions of the logs, where each of the digitized versions of the logs includes a digitized plot with an associated digitized header and an associated digitized track. One or more computer-readable storage media can include processor-executable instructions to instruct a computing system to: receive raster images of logs, where the logs include plots, tracks and headers and where, compared to the plots and the tracks, the headers are underrepresented; process the raster images using a trained machine learning model to generate segmentation masks for the logs for identification of the plots, the tracks and the headers; and generate digitized versions of the logs using the segmentation masks, where each of the digitized versions of the logs includes a digitized plot with an associated digitized header and an associated digitized track. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 7 illustrates examples of logs and examples of segmentation masks;

FIG. 19 illustrates an example of a method and an example of a system; and

DETAILED DESCRIPTION

This description is not to be taken in a limiting sense, but rather is made merely for the purpose of describing the general principles of the implementations. The scope of the described implementations should be ascertained with reference to the issued claims.

Figure 1:
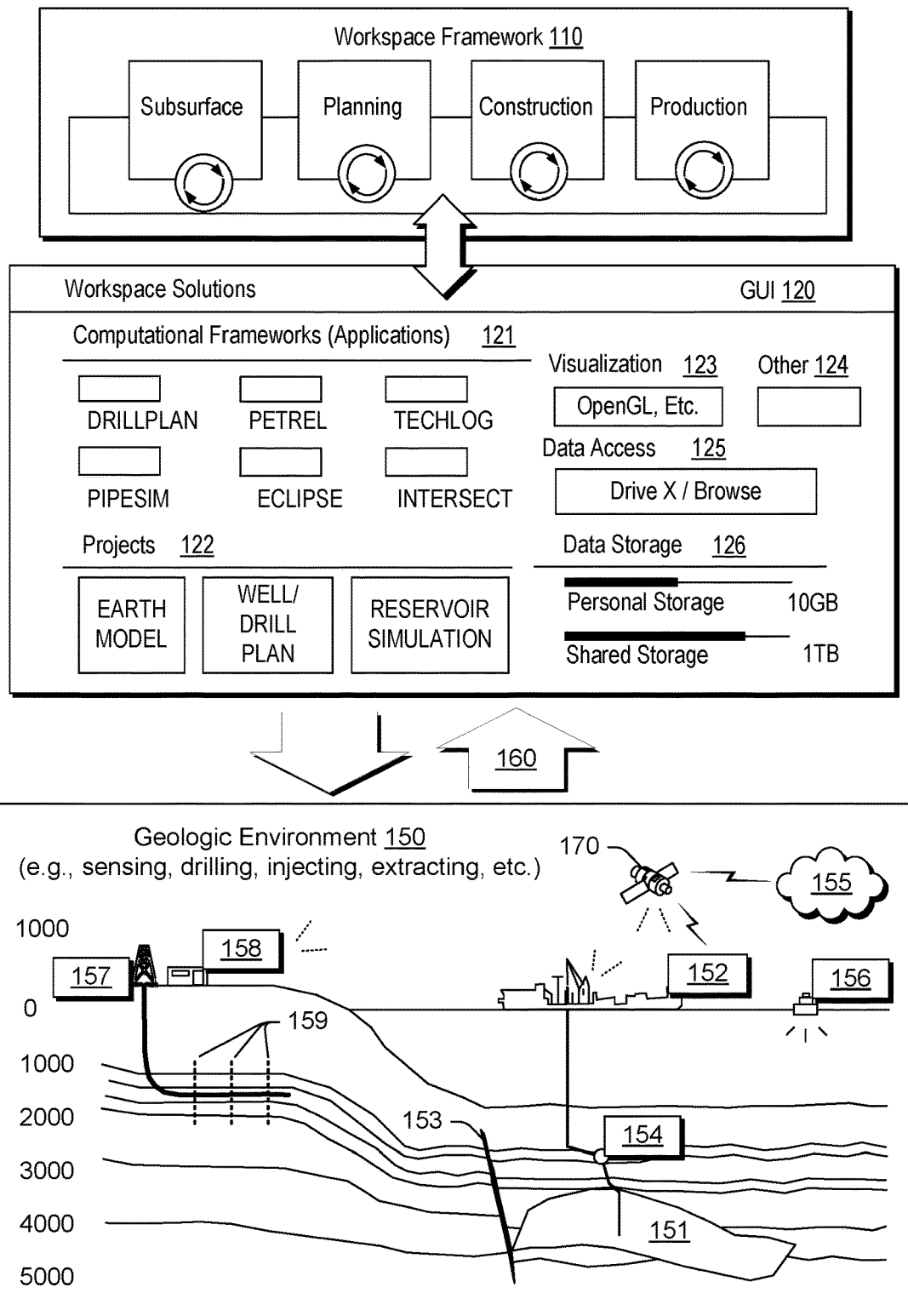
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. A geologic environment 150 may be outfitted with a variety of sensors, detectors, actuators, etc. In such an environment, various types of equipment such as, for example, equipment 152 may include communication circuitry to receive and to transmit information, optionally with respect to one or more networks 155. Such information may include information associated with downhole equipment 154, which may be equipment to acquire information, to assist with resource recovery, etc. Other equipment 156 may be located remote from a wellsite and include sensing, detecting, emitting, or other circuitry. Such equipment may include storage and communication circuitry to store and to communicate data, instructions, etc. One or more satellites may be provided for purposes of communications, data acquisition, etc. For example, FIG. 1 shows a satellite 170 in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc., may exist where an assessment of such variations may assist with planning, operations, etc., to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (Schlumberger Limited, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). Such an environment can provide for operations that involve one or more frameworks. The DELFI environment may be referred to as the DELFI framework, which may be a framework of frameworks. The DELFI environment can include various other frameworks, which may operate using one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). The PIPESIM simulator may be an optimizer that can optimize one or more operational scenarios at least in part via simulation of physical phenomena.

The ECLIPSE framework provides a reservoir simulator with numerical solvers for prediction of dynamic behavior for various types of reservoirs and development schemes.

The INTERSECT framework provides a high-resolution reservoir simulator for simulation of geological features and quantification of uncertainties, for example, by creating production scenarios and, with the integration of precise models of the surface facilities and field operations, the INTERSECT framework can produce results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150, and feedback 160 can be received via one or more interfaces in one or more forms (e.g., acquired data as to operational conditions, equipment conditions, environment conditions, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

Visualization features may provide for visualization of various earth models, properties, etc., in one or more dimensions. As an example, visualization features may include one or more control features for control of equipment, which can include, for example, field equipment that can perform one or more field operations. A workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.). Field acquisition equipment may be utilized to acquire seismic data, which may be in the form of traces where a trace can include values organized with respect to time and/or depth (e.g., consider 1D, 2D, 3D or 4D seismic data).

A model may be a simulated version of a geologic environment where a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. While several simulators are illustrated in the example of FIG. 1, one or more other simulators may be utilized, additionally or alternatively.

Figure 2:
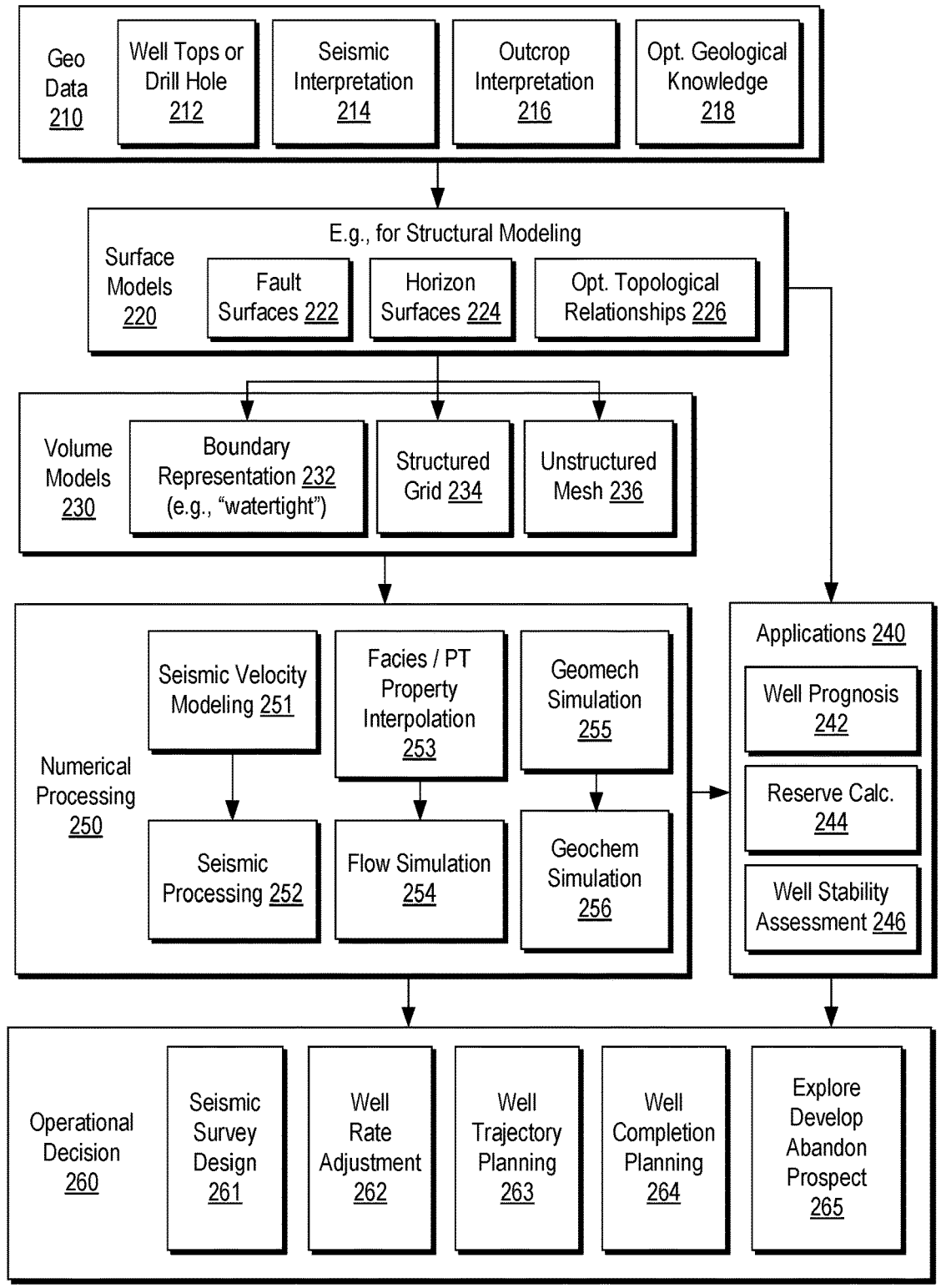
FIG. 2 illustrates an example of a system.

FIG. 2 shows an example of a system 200 that can be operatively coupled to one or more databases, data streams, etc. For example, one or more pieces of field equipment, laboratory equipment, computing equipment (e.g., local and/or remote), etc., can provide and/or generate data that may be utilized in the system 200.

As shown, the system 200 can include a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As an example, the geological/geophysical data block 210 can include data from digital images, which can include digital images of cores, cuttings, cavings, outcrops, etc. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the facies and petrophysical property interpolation 253, it may include an assessment of type of rocks and of their petrophysical properties (e.g., porosity, permeability), for example, optionally in areas not sampled by well logs or coring. As an example, such an interpolation may be constrained by interpretations from log and core data, and by prior geological knowledge.

As to the various applications of the applications block 240, the well prognosis application 242 may include predicting type and characteristics of geological formations that may be encountered by a drill bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

The system 200 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 200. In such an example, access may be provided to one or more frameworks (e.g., DRILLPLAN, PETREL, TECHLOG, PIPESIM, ECLIPSE, INTERSECT, etc.). One or more frameworks may provide for geo data acquisition as in block 210, for structural modeling as in block 220, for volume modeling as in block 230, for running an application as in block 240, for numerical processing as in block 250, for operational decision making as in block 260, etc.

As an example, the system 200 may provide for monitoring data, which can include geo data per the geo data block 210. In various examples, geo data may be acquired during one or more operations. For example, consider acquiring geo data during drilling operations via downhole equipment and/or surface equipment. As an example, the operational decision block 260 can include capabilities for monitoring, analyzing, etc., such data for purposes of making one or more operational decisions, which may include controlling equipment, revising operations, revising a plan, etc. In such an example, data may be fed into the system 200 at one or more points where the quality of the data may be of particular interest. For example, data quality may be characterized by one or more metrics where data quality may provide indications as to trust, probabilities, etc., which may be germane to operational decision making and/or other decision making.

Figure 3:
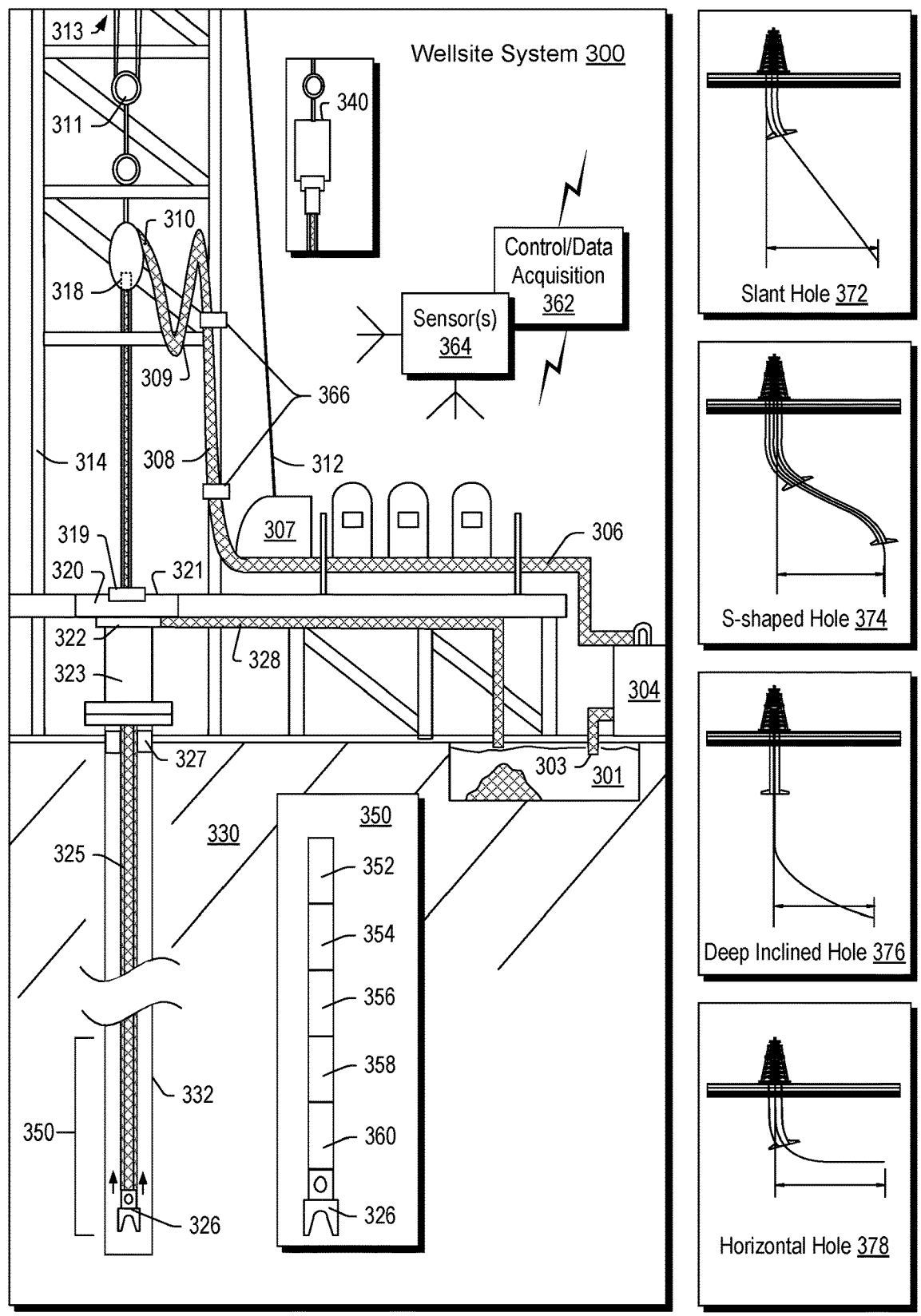
FIG. 3 illustrates an example of a drilling equipment and examples of borehole shapes.

FIG. 3 shows an example of a wellsite system 300 (e.g., at a wellsite that may be onshore or offshore). As shown, the wellsite system 300 can include a mud tank 301 for holding mud and other material (e.g., where mud can be a drilling fluid), a suction line 303 that serves as an inlet to a mud pump 304 for pumping mud from the mud tank 301 such that mud flows to a vibrating hose 306, a drawworks 307 for winching drill line or drill lines 312, a standpipe 308 that receives mud from the vibrating hose 306, a kelly hose 309 that receives mud from the standpipe 308, a gooseneck or goosenecks 310, a traveling block 311, a crown block 313 for carrying the traveling block 311 via the drill line or drill lines 312, a derrick 314, a kelly 318 or a top drive 340, a kelly drive bushing 319, a rotary table 320, a drill floor 321, a bell nipple 322, one or more blowout preventors (BOPs) 323, a drillstring 325, a drill bit 326, a casing head 327 and a flow pipe 328 that carries mud and other material to, for example, the mud tank 301.

In the example system of FIG. 3, a borehole 332 is formed in subsurface formations 330 by rotary drilling; noting that various example embodiments may also use one or more directional drilling techniques, equipment, etc.

As shown in the example of FIG. 3, the drillstring 325 is suspended within the borehole 332 and has a drillstring assembly 350 that includes the drill bit 326 at its lower end. As an example, the drillstring assembly 350 may be a bottom hole assembly (BHA).

The wellsite system 300 can provide for operation of the drillstring 325 and other operations. As shown, the wellsite system 300 includes the traveling block 311 and the derrick 314 positioned over the borehole 332. As mentioned, the wellsite system 300 can include the rotary table 320 where the drillstring 325 pass through an opening in the rotary table 320.

As shown in the example of FIG. 3, the wellsite system 300 can include the kelly 318 and associated components, etc., or the top drive 340 and associated components. As to a kelly example, the kelly 318 may be a square or hexagonal metal/alloy bar with a hole drilled therein that serves as a mud flow path. The kelly 318 can be used to transmit rotary motion from the rotary table 320 via the kelly drive bushing 319 to the drillstring 325, while allowing the drillstring 325 to be lowered or raised during rotation. The kelly 318 can pass through the kelly drive bushing 319, which can be driven by the rotary table 320. As an example, the rotary table 320 can include a master bushing that operatively couples to the kelly drive bushing 319 such that rotation of the rotary table 320 can turn the kelly drive bushing 319 and hence the kelly 318. The kelly drive bushing 319 can include an inside profile matching an outside profile (e.g., square, hexagonal, etc.) of the kelly 318; however, with slightly larger dimensions so that the kelly 318 can freely move up and down inside the kelly drive bushing 319.

As to a top drive example, the top drive 340 can provide functions performed by a kelly and a rotary table. The top drive 340 can turn the drillstring 325. As an example, the top drive 340 can include one or more motors (e.g., electric and/or hydraulic) connected with appropriate gearing to a short section of pipe called a quill, that in turn may be screwed into a saver sub or the drillstring 325 itself. The top drive 340 can be suspended from the traveling block 311, so the rotary mechanism is free to travel up and down the derrick 314. As an example, a top drive 340 may allow for drilling to be performed with more joint stands than a kelly/rotary table approach.

In the example of FIG. 3, the mud tank 301 can hold mud, which can be one or more types of drilling fluids. As an example, a wellbore may be drilled to produce fluid, inject fluid or both (e.g., hydrocarbons, minerals, water, etc.).

In the example of FIG. 3, the drillstring 325 (e.g., including one or more downhole tools) may be composed of a series of pipes threadably connected together to form a long tube with the drill bit 326 at the lower end thereof. As the drillstring 325 is advanced into a wellbore for drilling, at some point in time prior to or coincident with drilling, the mud may be pumped by the pump 304 from the mud tank 301 (e.g., or other source) via the lines 306, 308 and 309 to a port of the kelly 318 or, for example, to a port of the top drive 340. The mud can then flow via a passage (e.g., or passages) in the drillstring 325 and out of ports located on the drill bit 326 (see, e.g., a directional arrow). As the mud exits the drillstring 325 via ports in the drill bit 326, it can then circulate upwardly through an annular region between an outer surface(s) of the drillstring 325 and surrounding wall(s) (e.g., open borehole, casing, etc.), as indicated by directional arrows. In such a manner, the mud lubricates the drill bit 326 and carries heat energy (e.g., frictional or other energy) and formation cuttings to the surface where the mud may be returned to the mud tank 301, for example, for recirculation with processing to remove cuttings and other material.

In the example of FIG. 3, processed mud pumped by the pump 304 into the drillstring 325 may, after exiting the drillstring 325, form a mudcake that lines the wellbore which, among other functions, may reduce friction between the drillstring 325 and surrounding wall(s) (e.g., borehole, casing, etc.). A reduction in friction may facilitate advancing or retracting the drillstring 325. During a drilling operation, the entire drillstring 325 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 326 of the drillstring 325 at a bottom of a wellbore, pumping of the mud commences to lubricate the drill bit 326 for purposes of drilling to enlarge the wellbore. As mentioned, the mud can be pumped by the pump 304 into a passage of the drillstring 325 and, upon filling of the passage, the mud may be used as a transmission medium to transmit energy, for example, energy that may encode information as in mud-pulse telemetry. Characteristics of the mud can be utilized to determine how pulses are transmitted (e.g., pulse shape, energy loss, transmission time, etc.).

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 325) may be transmitted uphole to an uphole device, which may relay such information to other equipment for processing, control, etc.

As an example, telemetry equipment may operate via transmission of energy via the drillstring 325 itself. For example, consider a signal generator that imparts coded energy signals to the drillstring 325 and repeaters that may receive such energy and repeat it to further transmit the coded energy signals (e.g., information, etc.).

As an example, the drillstring 325 may be fitted with telemetry equipment 352 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 3, an uphole control and/or data acquisition system 362 may include circuitry to sense pressure pulses generated by telemetry equipment 352 and, for example, communicate sensed pressure pulses or information derived therefrom for process, control, etc.

The assembly 350 of the illustrated example includes a logging-while-drilling (LWD) module 354, a measurement-while-drilling (MWD) module 356, an optional module 358, a rotary-steerable system (RSS) and/or motor 360, and the drill bit 326. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

The LWD module 354 may be housed in a suitable type of drill collar and can contain one or a plurality of selected types of logging tools. It will also be understood that more than one LWD and/or MWD module can be employed, for example, as represented at by the module 356 of the drillstring assembly 350. Where the position of an LWD module is mentioned, as an example, it may refer to a module at the position of the LWD module 354, the module 356, etc. An LWD module can include capabilities for measuring, processing, and storing information, as well as for communicating with the surface equipment. In the illustrated example, the LWD module 354 may include a seismic measuring device.

The MWD module 356 may be housed in a suitable type of drill collar and can contain one or more devices for measuring characteristics of the drillstring 325 and the drill bit 326. As an example, the MWD tool 354 may include equipment for generating electrical power, for example, to power various components of the drillstring 325. As an example, the MWD tool 354 may include the telemetry equipment 352, for example, where the turbine impeller can generate power by flow of the mud; it being understood that other power and/or battery systems may be employed for purposes of powering various components. As an example, the MWD module 356 may include one or more of the following types of measuring devices: a weight-on-bit measuring device, a torque measuring device, a vibration measuring device, a shock measuring device, a stick slip measuring device, a direction measuring device, and an inclination measuring device.

FIG. 3 also shows some examples of types of holes that may be drilled. For example, consider a slant hole 372, an S-shaped hole 374, a deep inclined hole 376 and a horizontal hole 378.

A drilling operation can include directional drilling where, for example, at least a portion of a well includes a curved axis. For example, consider a radius that defines curvature where an inclination with regard to the vertical may vary until reaching an angle between approximately 30 degrees and approximately 60 degrees or, for example, an angle to approximately 90 degrees or possibly greater than approximately 90 degrees.

A directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As explained, a system may be a steerable system and may include equipment to perform a method such as geosteering. A steerable system can include equipment on a lower part of a drillstring which, just above a drill bit, a bent sub may be mounted. Above directional drilling equipment, a drillstring can include MWD equipment that provides real time or near real time data of interest (e.g., inclination, direction, pressure, temperature, real weight on the drill bit, torque stress, etc.) and/or LWD equipment. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment to follow a desired route to reach a desired target or targets.

A drillstring may include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

Geosteering can include intentional directional control of a wellbore based on results of downhole geological logging measurements in a manner that aims to keep a directional wellbore within a desired region, zone (e.g., a pay zone), etc. Geosteering may include directing a wellbore to keep the wellbore in a particular section of a reservoir, for example, to minimize gas and/or water breakthrough and, for example, to maximize economic production from a well that includes the wellbore.

Referring again to FIG. 3, the wellsite system 300 can include one or more sensors 364 that are operatively coupled to the control and/or data acquisition system 362. As an example, a sensor or sensors may be at surface locations. As an example, a sensor or sensors may be at downhole locations. As an example, a sensor or sensors may be at one or more remote locations that are not within a distance of the order of approximately one hundred meters from the wellsite system 300.

The system 300 can include one or more sensors 366 that can sense and/or transmit signals to a fluid conduit such as a drilling fluid conduit (e.g., a drilling mud conduit). For example, in the system 300, the one or more sensors 366 can be operatively coupled to portions of the standpipe 308 through which mud flows. As an example, a downhole tool can generate pulses that can travel through the mud and be sensed by one or more of the one or more sensors 366. In such an example, the downhole tool can include associated circuitry such as, for example, encoding circuitry that can encode signals, for example, to reduce demands as to transmission. Circuitry at the surface may include decoding circuitry to decode encoded information transmitted at least in part via mud-pulse telemetry. Circuitry at the surface may include encoder circuitry and/or decoder circuitry and circuitry downhole may include encoder circuitry and/or decoder circuitry. As an example, the system 300 can include a transmitter that can generate signals that can be transmitted downhole via mud (e.g., drilling fluid) as a transmission medium.

Figure 4:
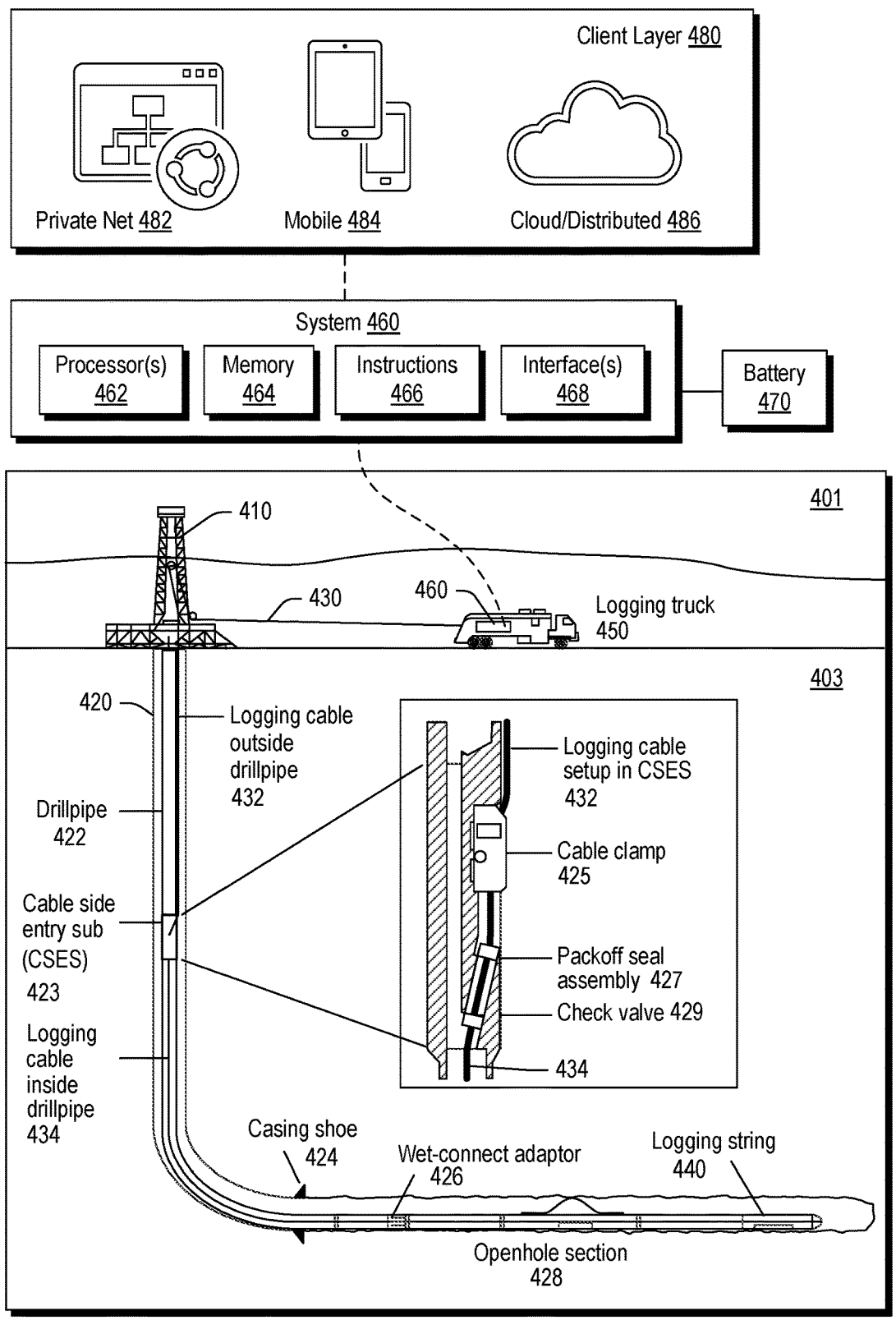
FIG. 4 illustrates an example of a system.

FIG. 4 shows an example of an environment 401 that includes a subterranean portion 403 where a rig 410 is positioned at a surface location above a bore 420. In the example of FIG. 4, various wirelines services equipment can be operated to perform one or more wirelines services including, for example, acquisition of data from one or more positions within the bore 420.

As an example, a wireline tool and/or a wireline service may provide for acquisition of data, analysis of data, data-based determinations, data-based decision making, etc. Some examples of wireline data can include gamma ray (GR), spontaneous potential (SP), caliper (CALI), shallow resistivity (LLS and ILD), deep resistivity (LLD and ILD), density (RHOB), neutron porosity (BPHI or TNPH or NPHI), sonic (DT), photoelectric (PEF), permittivity and conductivity.

In the example of FIG. 4, the bore 420 includes drillpipe 422, a casing shoe 424, a cable side entry sub (CSES) 423, a wet-connector adaptor 426 and an openhole section 428. As an example, the bore 420 can be a vertical bore or a deviated bore where one or more portions of the bore may be vertical and one or more portions of the bore may be deviated, including substantially horizontal.

In the example of FIG. 4, the CSES 423 includes a cable clamp 425, a packoff seal assembly 427 and a check valve 429. These components can provide for insertion of a logging cable 430 that includes a portion 432 that runs outside the drillpipe 422 to be inserted into the drillpipe 422 such that at least a portion 434 of the logging cable runs inside the drillpipe 422. In the example of FIG. 4, the logging cable 430 runs past the casing shoe 424 and the wet-connect adaptor 426 and into the openhole section 428 to a logging string 440.

As shown in the example of FIG. 4, a logging truck 450 (e.g., a wirelines services vehicle) can deploy the wireline 430 under control of a system 460. As shown in the example of FIG. 4, the system 460 can include one or more processors 462, memory 464 operatively coupled to at least one of the one or more processors 462, instructions 466 that can be, for example, stored in the memory 464, and one or more interfaces 468. As an example, the system 460 can include one or more processor-readable media that include processor-executable instructions executable by at least one of the one or more processors 462 to cause the system 460 to control one or more aspects of equipment of the logging string 440 and/or the logging truck 450. In such an example, the memory 464 can be or include the one or more processor-readable media where the processor-executable instructions can be or include instructions. As an example, a processor-readable medium can be a computer-readable storage medium that is not a signal and that is not a carrier wave.

FIG. 4 also shows a battery 470 that may be operatively coupled to the system 460, for example, to power the system 460. As an example, the battery 470 may be a back-up battery that operates when another power supply is unavailable for powering the system 460 (e.g., via a generator of the wirelines truck 450, a separate generator, a power line, etc.). As an example, the battery 470 may be operatively coupled to a network, which may be a cloud network. As an example, the battery 470 can include smart battery circuitry and may be operatively coupled to one or more pieces of equipment via a SMBus or other type of bus.

As an example, the system 460 can be operatively coupled to a client layer 480. In the example of FIG. 4, the client layer 480 can include features that allow for access and interactions via one or more private networks 482, one or more mobile platforms and/or mobile networks 484 and via the "cloud" 486, which may be considered to include distributed equipment that forms a network such as a network of networks. As an example, the system 460 can include circuitry to establish a plurality of connections (e.g., sessions). As an example, connections may be via one or more types of networks. As an example, connections may be client-server types of connections where the system 460 operates as a server in a client-server architecture. For example, clients may log-in to the system 460 where multiple clients may be handled, optionally simultaneously.

While the example of FIG. 4 shows the system 460 as being associated with the logging truck 450, one or more features of the system 460 may be included in a downhole assembly, which may be a wireline assembly and/or a LWD assembly. In such an approach, various computations may be performed downhole where results thereof may be optionally transmitted to surface (e.g., to the logging truck 450, etc.) using one or more telemetric technologies and/or techniques (e.g., mud-pulse telemetry, wireline, etc.).

Figure 5:
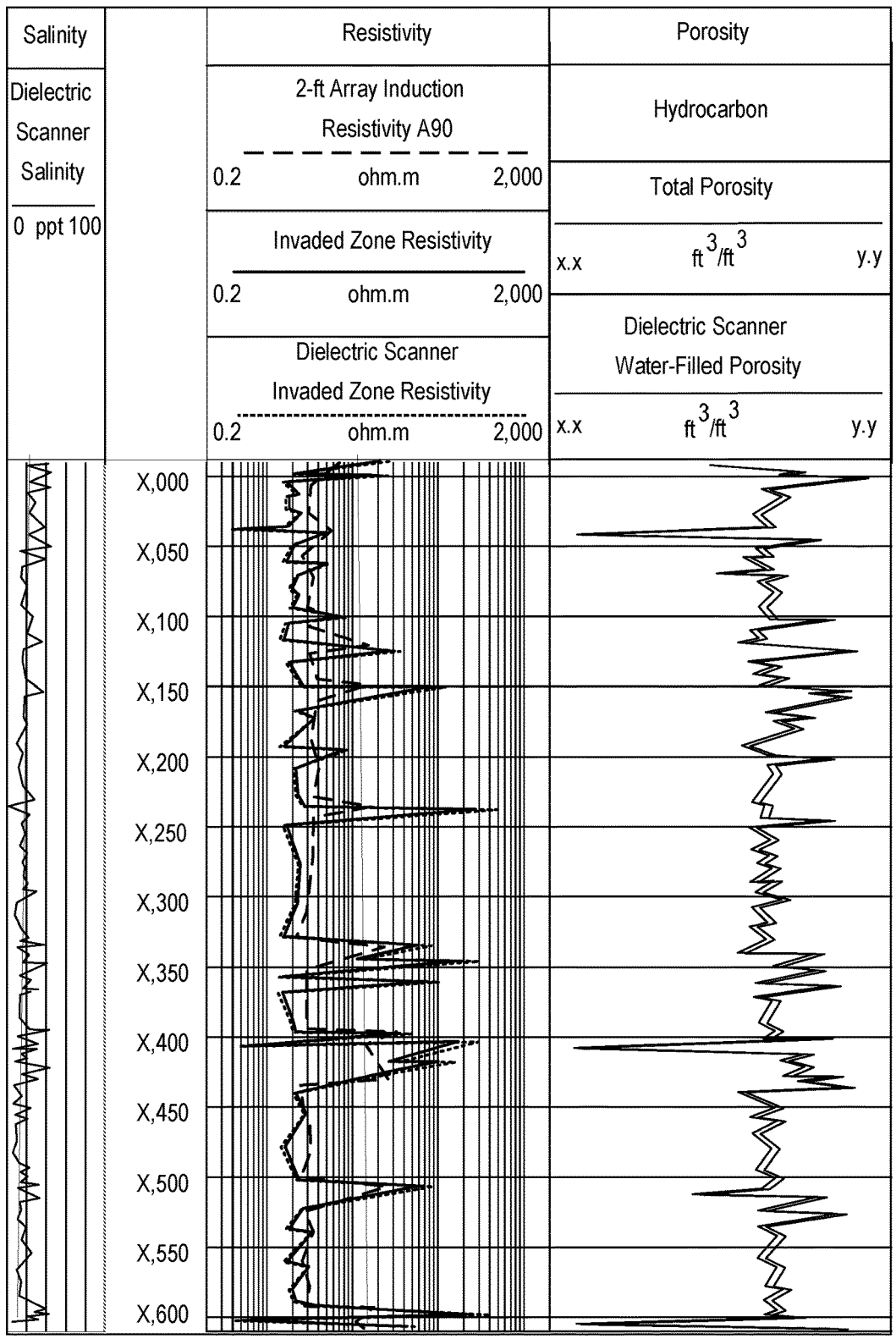
FIG. 5 illustrates examples of logs.

FIG. 5 shows an example of logs 500 as acquired using one or more downhole assemblies. In the example of FIG. 5, the logs 500 include a salinity log, a resistivity log and a porosity log. Each of the logs includes a header where the header can include various types of information for each of the logs. For example, the resistivity log indicates an array induction resistivity, an invaded zone resistivity and a dielectric scanner invaded zone resistivity, which are plotted using a range from 0.2 ohm·m to 2,000 ohm·m. As to the porosity log, the header includes indications for hydrocarbons, total porosity, and dielectric scanner water-filled porosity, which are plotted using a range of volume with respect to volume.

In various instances, logs may be provided in a digital form, as originally generated digitally by equipment. However, in other instances, logs may be provided on paper, as scans of paper and/or as captured images from a display. In such instances, the logs may be of a fixed resolution as determined by a scanner, a camera, etc.

As an example, logs may be provided in raster form. In computer graphics and digital photography, a raster graphic represents a two-dimensional picture as a rectangular matrix or grid of square pixels, viewable via a computer display, paper, or other display medium. A raster is technically characterized by width and height of an image in pixels and by number of bits per pixel. Raster images can be stored in image files with varying dissemination, production, generation, and acquisition formats. Images may be stored using one or more raster graphics formats or compressed variations, which may include, for example, GIF, JPEG, and PNG.

Figure 6:
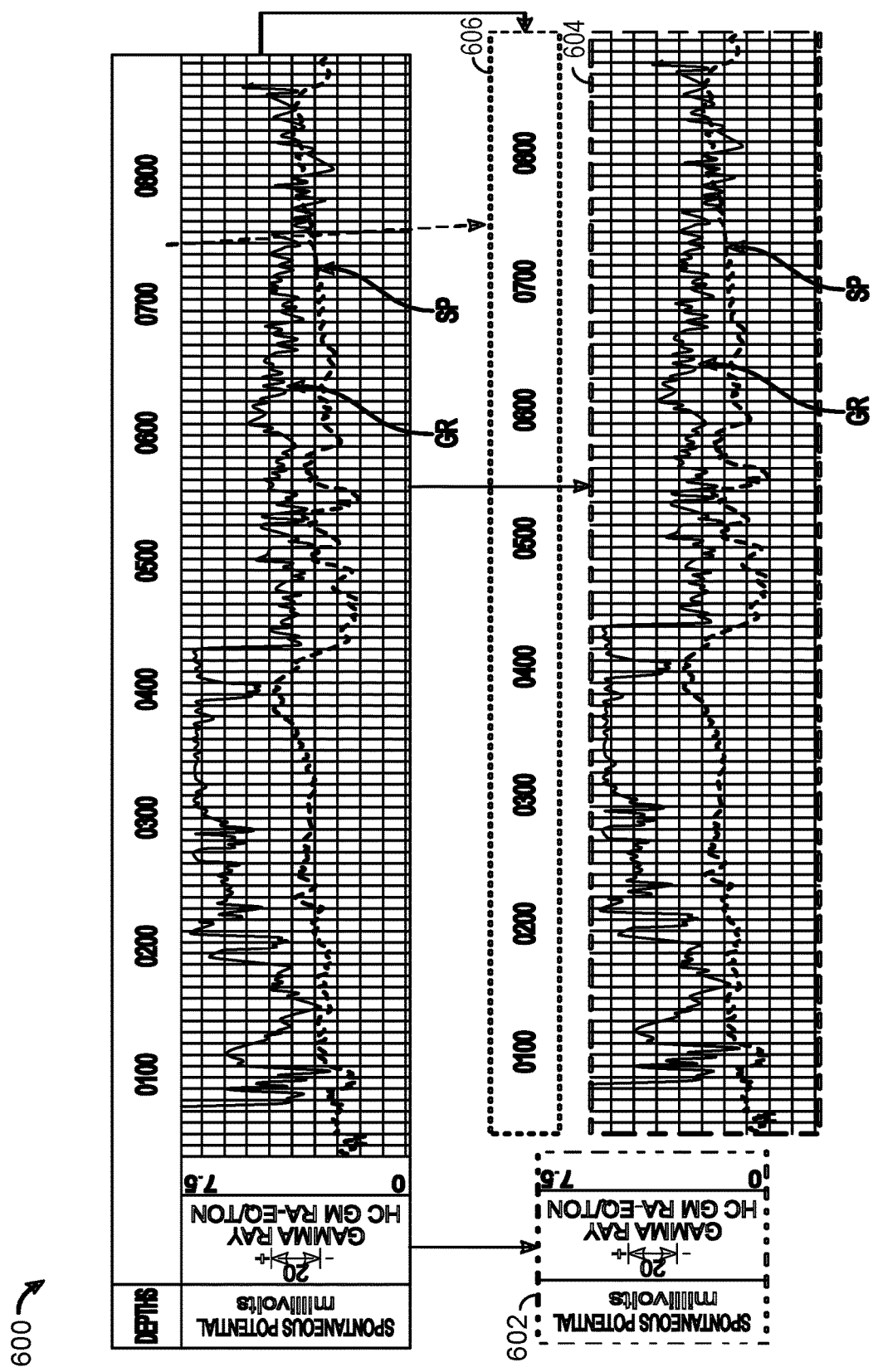
FIG. 6 illustrates examples of logs and examples of segments of logs.

FIG. 6 shows an example of a log 600 as a raster image and how various features of the log 600 may be sections or segments of the raster image. In the example of FIG. 5, the logs 500 are presented vertically with respect to depth. In the example of FIG. 6, the log 600 is presented horizontally with respect to depth. As an example, a log or logs may be in a portrait orientation (e.g., vertical) or in a landscape orientation (e.g., horizontal).

As shown, the log 600 may include sections, each providing different information. For example, the log 600 may include a log header section 602, a plot section 604, and a depth track 606. The log header section 602 may provide a legend or key for understanding the curve found in the plot section 604. For example, the log header section 602 may specify information such as line type (e.g., dashes and dots) for the curve, data type (e.g., gamma ray (GR)), scale, type of sensed data (e.g., spontaneous-potential (SP)) units (e.g., millivolts), etc. The depth track 606 may specify an independent variable for the sensor readings recorded in the plot section 602; however, it will be recognized that the depth track 606 is just one example of an independent variable that may be produced as a feature along an X (or other independent variable) axis of a plot section 604 or another feature of an object.

As an example, a log can include one or more types of scales, which may be part of a track or part of a header. As an example, a scale may be a graduated scale. As an example, a graduation can be a marking used to indicate points on a visual scale (e.g., as in a raster image). A scale may be present in one dimension or scales may be present in multiple dimensions (e.g., an x-dimension, a y-dimension, a z-dimension, a radial dimension, a directional dimension, an angular dimension, a time dimension, etc.). A scale may be present at an axis of a plot or scales may be present at an axis or axes of a plot. In some instances, lines may be utilized with line segments that may be of the same length or different lengths, where at least some may be marked with a numeral, such as every fifth or tenth graduation. As an example, a scale itself may be linear (e.g., graduations spaced at a constant distance apart) or it may be nonlinear. As an example, graduations may be spaced at varying spatial intervals, which may occur for a nonlinear scale (e.g., consider a logarithmic scale).

As explained, raster images can be a source of log and related information. Digitizing log data can facilitate various applications and workflows such as, for example, log interpretation, correlation, and prediction. As an example, a method can include automatically extracting one or more raster regions such as, for example, plot segment(s), depth track, and log header, and further obtaining depth values at each pixel in an extracted depth track region.

As an example, a method can include automatically extracting a raster region by employing deep learning-based semantic segmentation. As an example, in a depth track, a per pixel depth value may be obtained, for example, using interpolation and data augmentation of a number of depth values. In such an example, optical character recognition (OCR) may be utilized, for example, by implementing an OCR engine or OCR engines. While inferior quality of a raster image may result in OCR extracting noisy depth values, to handle noisy samples of depth values, a method may include denoising of depth values using machine learning (ML), for example, consider a ML technique of ensemble of outlier detections. As an example, a raster image may be provided in black and white, grayscale or color where features of an automatic extraction system can handle black and white, grayscale and/or color raster images (e.g., raster image files).

FIG. 7 shows examples of raster segmentation using an image-to-image translation approach where examples of raster images 712 and 714 are processed to generate corresponding masks 722 and 724. In the examples of FIG. 7, the output segmentation masks 722 and 724 include one or more plot segments (see, e.g., cross-hatching upper left to lower right pattern), one or more depth tracks (see, e.g., white), and one or more log headers (see, e.g., cross-hatching lower left to upper right pattern). As an example, another segment may be a background segment (see, e.g., black), which may be a region that is does not fit into a classification for a desired segment. For example, background may be a region that is not classified as a plot segment, a track or a header. As an example, a system can include receiving the raster image as input and processing the raster image to generate a segmentation mask as output.

Figure 8:
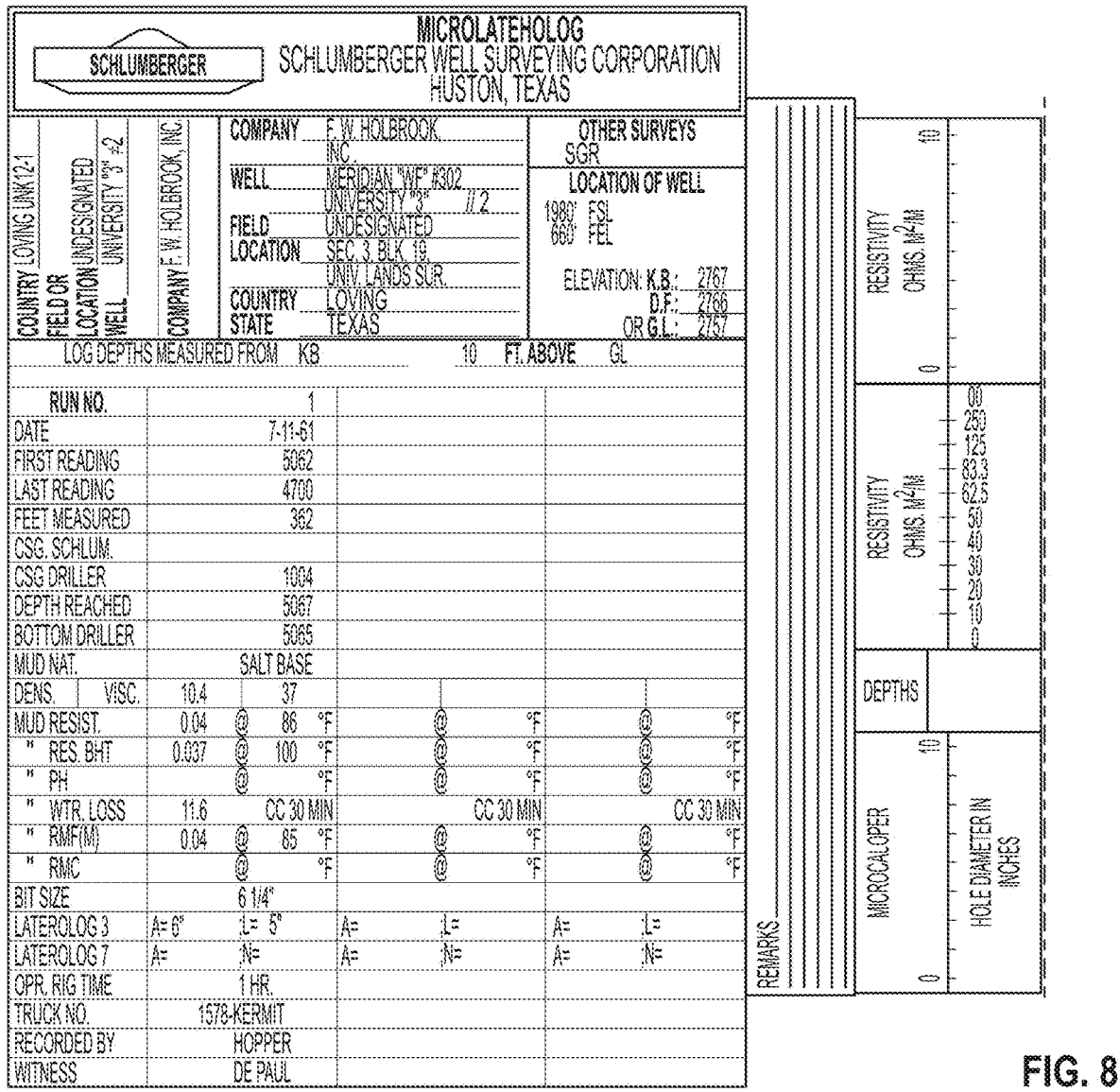
FIG. 8 illustrates an example of a log and an example of a track with values.
Figure 8:
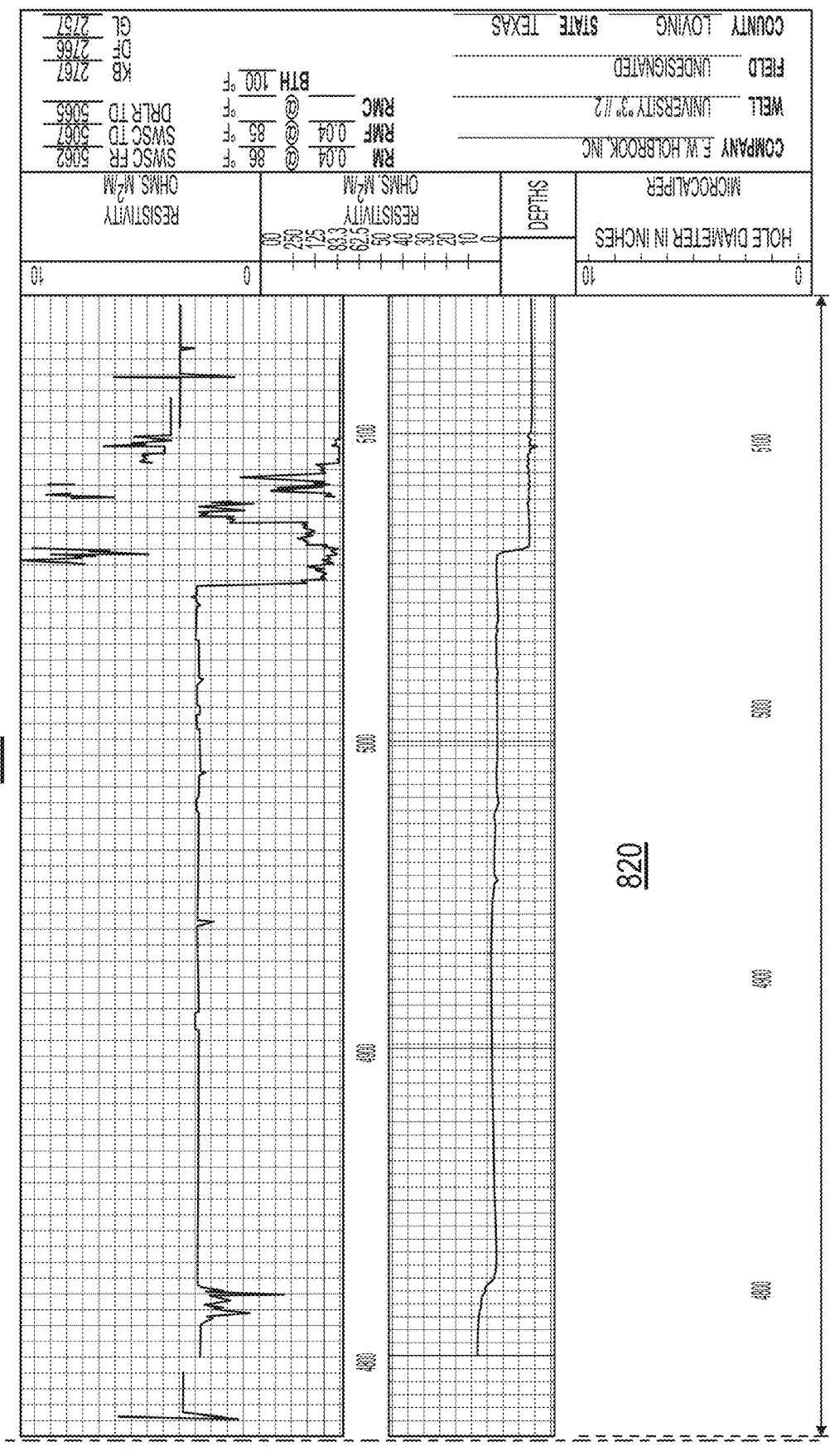

FIG. 8 shows an example of a raster image 800 and its depth track region 820 with a few depth values. As explained, a system can provide for depth track processing to extract per pixel depth with an aim to obtain start and end depth values. As shown in FIG. 8, the depth values include 4800, 4900, 5000 and 5100 where a start value is determined to be 4733.3 and an end value is determined to be 5143.7. While the example of FIG. 8 pertains to a track that is not part of a header, such an approach may be applied, for example, to a scale or scales that may be part of a header. For example, consider a scale for measurements taken by a sensor or sensors with respect to depth. In such an example, a depth track may be processed as in the example of FIG. 8 while the scale for the measurements may be processed similarly, though with respect to a header, which, for example, may be subjected to additional processing such as scale extraction from a header, noting that in some instances a header may include more than one scale. As shown in the example of FIG. 8, a track may pertain to more than one plot. For example, the depth track region 820 includes a depth track that pertains to two different resistivity measurements and to microcaliper measurements. Hence, a single depth track may be processed and utilized for multiple plots.

As an example, a system can provide for raster segmentation with pixel wise accuracy and proper extraction of desired regions (e.g., plot segment, log header, depth track) of raster images. As an example, such a system can utilize a multistage segmentation process where, in a first stage, a coarse segmentation task is performed for complex multi-class segmentation and, in a second stage, based on inputs from the first stage, multiple simpler binary segmentation tasks are performed with high accuracy. As mentioned, a system can employ deep learning where a ML model can be a deep learning model that can be trained using deep learning. In such an example, training can be performed for raster segmentation using a suitably sized, labeled data set.

As an example, data augmentation may be utilized for first and second stages based at least in part on domain knowledge about raster structures.

As explained, FIG. 6 shows an example of a raster image of the log 600 as including the plot segment 604, the log header 602, and the depth track 606 as separate regions. As explained, FIG. 7 shows examples of input and output of a raster segmentation system where the input is a raster image and the output is a segmentation mask. As explained, FIG. 8 shows an example for depth track processing that can include use of one or more OCR engines for identification of a number of depth values (e.g., three values, four values, etc.).

As to depth track processing, a system can utilize a depth track region in a raster image that may include a few depth values where, for example, a start depth value and/or an end depth value may be missing. Such a system can operate to extract per pixel depth values using a few available depth values. Again, in the example of FIG. 8, four depth values are identified using one or more OCR engines.

For one or more reasons, a depth value may be noisy such that, for example, one or more errors may arise in obtaining a depth per pixel value (e.g., due to incorrect interpolation). As an example, a system can include a denoising component that can implement an ensemble of outlier detection process to obtain an accurate depth per pixel value where one or more noisy depth values exist. As an example, a system may automatically implement such a denoising component responsive to one or more conditions. For example, consider a violation in a sequence where two sequential values increase and a subsequent value decreases. In such an example, an assumption may be made that depth is increasing in a particular direction such that the value that decreases is noisy where implementation of the denoising component can improve determining of what the noisy value may actually be.

Referring again to the example of FIG. 8, the start and end values are missing in the raster image. However, through determination of a depth per pixel value, a system can determine the start and end values of depth corresponding to a plot segment. Such a depth per pixel value can be referred to as a metric per pixel value where the metric is a depth metric. Where time is present, a metric per pixel value may be a time per pixel value. In various other instances, a measurement may be characterized using a metric per pixel value (e.g., resistivity per pixel, etc.).

As an example, a system may include one or more features of a Pix2Pix system. An article by Isola et al., Image-to-image translation with conditional adversarial networks, Proceedings of the IEEE Conference on Computer Vision and Pattern Recognition, pp. 1125-1134, 2017 is incorporated by reference herein. The article by Isola et al. describes an example of a Pix2Pix system and method. The Pix2Pix approach is an approach for image translation while the aforementioned multistage approach can be specifically designed to suit raster segmentation tasks with a high pixel level accuracy. Such a multistage approach can be suitable for handling raster images of logs. As an example, a multistage approach can provide for management of classes. For example, in various instances, a two class problem may be solved with greater accuracy than a problem with more than two classes. Thus, a multistage approach may aim to break down a multiclass problem into multiple smaller class problems (e.g., two class problems) such that accuracy can be improved through use of multiple stages. Such an approach can make a system more robust as it may operate with lesser uncertainty and hence greater certainty.

As an example, a system can include one or more Generative Adversarial Networks (GANs). For example, consider using multiple GANs, which may be utilized in multiple stages. As an example, a first stage may utilize a first GAN and a second stage may utilize multiple GANs for different processes, which may provide for enhancing accuracy of output from the first stage. As an example, a GAN may be a conditional GAN. A conditional GAN may be trained to map edges to a photo. In such an example, a discriminator, D, can learn to classify between fake (synthesized by a generator, G) and real {edge, photo} tuples. In such an example, the generator, G, learns to fool the discriminator. Unlike an unconditional GAN, a generator, G, and a discriminator, D, observe the input edge map. As an example, for a GAN generator, G, a U-Net-based architecture may be utilized and, for example, for a GAN discriminator, D, a convolutional PatchGAN classifier may be utilized, which penalizes structure at the scale of image patches. As to a U-Net-based architecture, it can be structured as an encoder-decoder with skip connections between mirrored layers in the encoder and decoder stacks. As explained, a system can include multiple GANs, which may include one or more conditional GANs. As explained, a system can provide for staged operation where, for example, number of classes in a problem may be reduced in moving from one stage to another stage.

Figure 9:
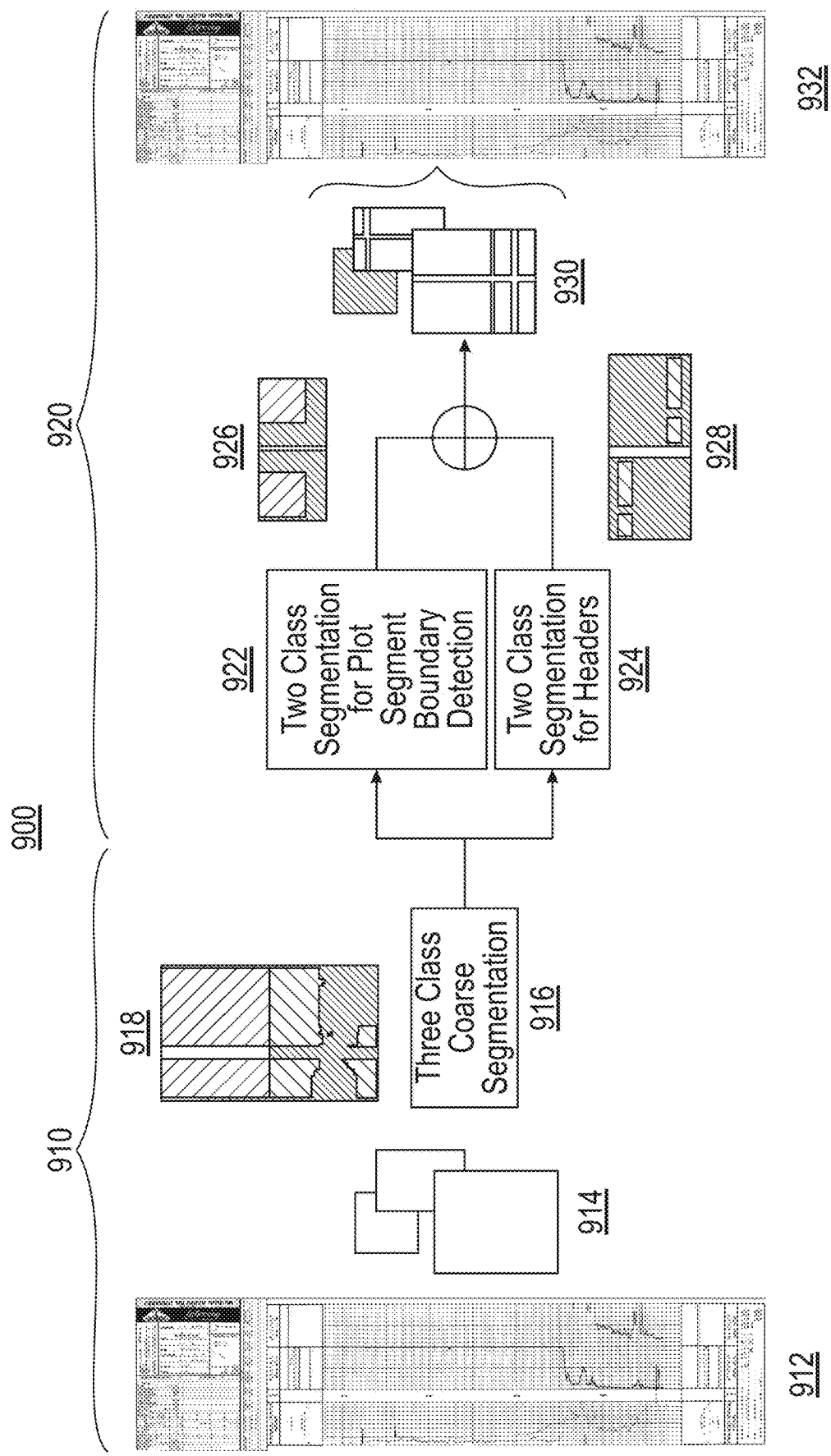
FIG. 9 illustrates an example of a system for processing raster images.

FIG. 9 shows an example of a raster segmentation system 900 that includes stages 910 and 920. As shown, the stage 910 can include receiving one or more raster images 912 and/or one or more raster tiles 914 that can be processed by a multi-class course segmentation component 916 to generate a result 918, for example, as a mask that includes regions that correspond to different classes of multiple classes. As shown, the stage 920 can include receiving the result 918 from the stage 910 and using a two-class segmentation component 922 for plot segment boundary detection to generate a result 926 and using a two-class segmentation component 924 for log header detection to generate a result 928. As shown, the results 926 and 928 can be utilized to generate segmented raster tiles 930 that can be combined or otherwise organized to generate a segmented raster image 932 (e.g., a segmented raster image of the raster image 912).

In the example of FIG. 9, in the stage 910, the component 916 can identify coarse locations of plot segments, log headers, and depth tracks where, in the stage 920, based on the coarse locations of log header regions from the stage 910, an appropriate region or regions of a raster image can be cropped. Such a region or regions can be fed to a system component to obtain finer bounding boxes, for example, as to plot segments and log headers.

As a raster image of a log includes useful information such as data acquired from one or more downhole assemblies during downhole operations, pixel level accuracy can enhance extraction and/or interpretation of such information.

To enhance pixel level accuracy, a tile based approach can be utilized for raster segmentation of relatively large raster documents where a system can fragment a long/large raster image into smaller tiles. In such an example, raster segmentation of each tile may be carried out separately. Such an approach can help to reduce rescaling of relatively large raster images to a small size and reduce loss of information arising due to processing of small sized documents.

As an example, a method can include using tiles where iterations may be utilized that involve shifting of tiles (e.g., shifting tile boundaries). As an example, a log header segmentation process can include using an ensemble approach. For example, a method can include passing a tile through a log header segmentation process iteratively where an iteration can involve shifting the tile such that the position of a log header within the tile can change for each iteration. In such an example, output from each iteration may be combined to arrive at a combined result (e.g., an ensemble result).

As to size of raster images, classification as to large or small can depend on a length of a raster image. For example, a log can be relatively long such that it has an aspect ratio of length to width where the length can be many times the width (e.g., consider a length that is 100 times the width). Such logs may be originally generated using rolls of paper that are in machines that print to the paper where the logs are then scanned using a scanner. A large raster image (e.g., in terms of length) may be too large for receipt by a graphics processing unit (GPU) as may be utilized by a framework for performing machine learning. For example, consider the PYTORCH framework (Facebook AI Research Lab (FAIR), Facebook, Inc., Menlo Park, California) where GPUs may be utilized in an effort to expedite processing. In such an example, memory demands may be quite large where a long log can make memory management and processing challenging.

As explained, ML models, particularly for deep learning, can have a bottleneck in training where images are large, which, as explained, can occur when the images are logs. As an example, to handle large raster images such as large logs, a framework may utilize a tile-based approach that can facilitate training and, for example, memory management in a manner that can facilitate processing by one or more cores (e.g., GPU cores, etc.). However, tiling may pose a risk of cutting of one or more raster images at one or more locations that can include vital information. For example, consider a header as a feature of a log that includes vital information, which, as explained, can be underrepresented in training data. If a tile boundary passes through or is closer to a header, then detection of the header may be problematic (e.g., lacking accuracy). To address such a challenge, an approach as shown in FIG. 9 may be taken where multiple stages are utilized. For example, the system 900 of FIG. 9 includes the two stages 910 and 920 where, in the first stage 910, coarse locations of headers can be obtained (see, e.g., 918) and where, in the second stage 920, accurate detection for headers can be performed based on results from the first stage 910.

As explained, the system 900 can provide for handling of one or more large raster images that can be characterized by aspect ratio and length, as may depend on an original logging machine that records log data via use of a printer that prints to paper supplied on a roll. For example, consider a roll of paper that has a width of approximately 5 centimeters and a length of approximately 1500 centimeters. Such a roll of paper may be utilized by a logging machine to record a number of logs where each log has a length that is greater than the width of the paper. As explained, a length of a log may be 10 times greater, 20 times greater, or more than 20 times greater than the width. Another type of logging paper may be in sheet form where sheets are folded, for example, in an accordion style. In such an example, the paper may be a contiguous paper of hundreds of sheets. As an example, consider a PRINTREX printer (TransAct Technologies Incorporated, Ithaca, NY) such as the PRINTREX 980 printer that can print at a speed of 20 cm per second using paper with a sheet size of approximately 22.2 cm by 15.875 cm. In such an example, a log may be at least several sheets long and may be tens of sheets in length. As logs may have been acquired over a relatively long span in time, some logs can be of formats that correspond to technologies that may be antiquated. For example, consider a log from the 1950s or earlier prior to the existence of sophisticated printers. As an example, the system 900 of FIG. 9 may be suitable for handling a number of raster images of a number of logs where the logs were originally acquired at different times, optionally using different recording technologies (e.g., different types of printers, etc.). In such an example, quality, aspect ratio, types of information, etc., may differ from log to log.

The system 900 of FIG. 9 may be utilized to help assure that processing of raster images of logs can be performed in a reasonable manner using machine learning and suitable hardware where vital information is adequately recognized and preserved to generate, for example, digitized versions of logs that may be then available for being digitally read as to plots and their associated headers and tracks (e.g., depth, time, etc.).

As explained, for processing of logs (e.g., as provided as raster images or paper to be scanned to raster images), multiple classes can be defined. As an example, consider four class as including plot segment, depth track, log header, and background. Such an approach can transform a semantic segmentation task into simpler multiple binary segmentation tasks.

Referring again to the stage 910 of FIG. 9, the result 918 is a coarse segmentation mask where, in the subsequent stage 912, the system 900 can focus on finer segmentation of log headers and plot segments for increased pixel level accurate performance. As the system 900 can implement raster segmentation uses a deep learning based approach, training demands as to amount of training data can be handled, for example, by creation of a relatively large corpus of labeled data from small size data using domain knowledge about a raster structure.

As an example, in the system 900, in the stage 910, from a given original raster image 912, multiple raster tiles 914 can be generated by cutting the original raster image 912 at various locations, for example, using a predefined aspect ratio. In such an example, the various locations may be determined randomly and/or according to a type of algorithm (e.g., sampling from a sequence, etc.). As to the stage 920, one or more regions surrounding a coarse position of a plot segment and a log header may be cropped. Such an approach of cropping of regions with various aspect ratios can help to improve data variability and hence segmentation performance.

As explained, the system 900 of the example of FIG. 9 can include the stage 910 for performing multiclass segmentation for a number of classes where the stage 920 can be for performing multiclass segmentation using multiple components that operate using a fewer classes than the multiclass segmentation of the stage 910. As an example, consider the stage 910 as including the component 916 for performing three or four class segmentation and consider the stage 920 as including the components 922 and 924 where each performs two class segmentation (e.g., binary segmentation). In such an approach, the stage 920 can perform finer and more accurate binary segmentation for log headers and plot segments separately.

Figure 10:
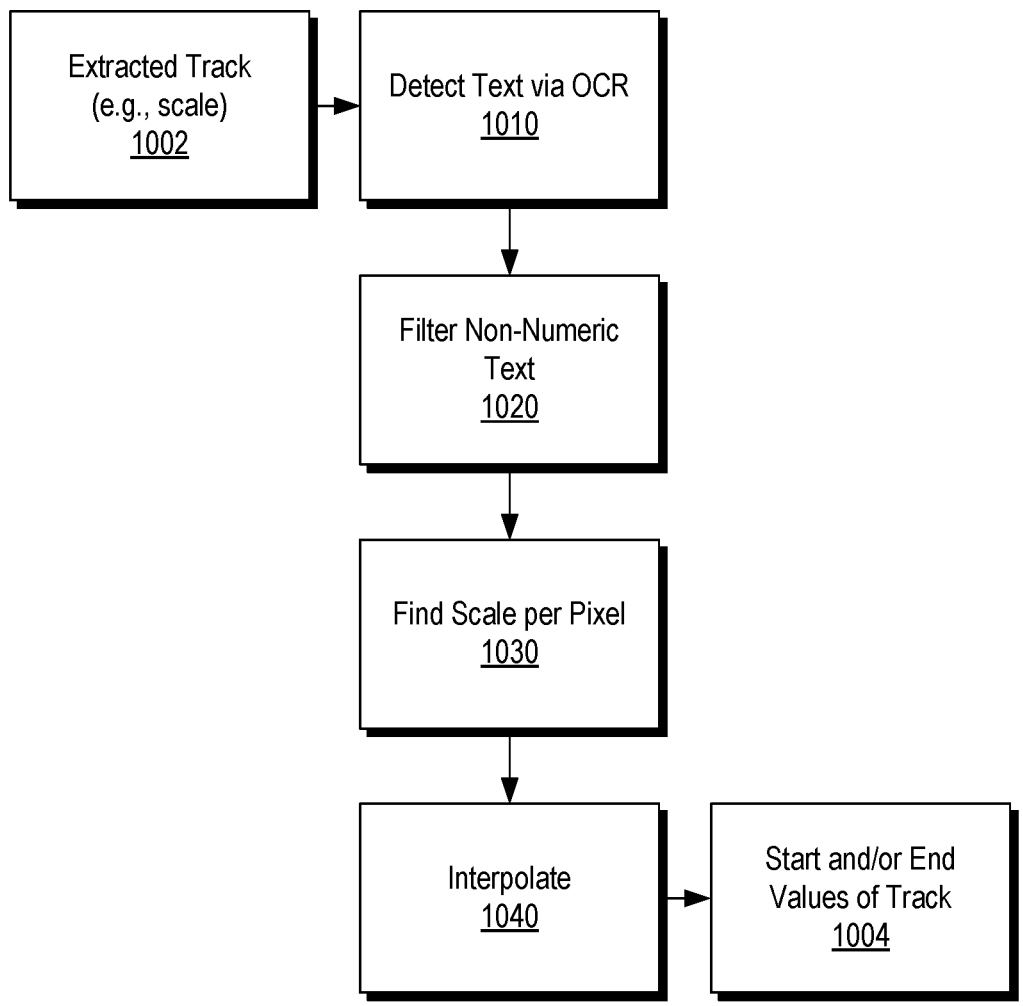
FIG. 10 illustrates an example of a method.

FIG. 10 shows an example of a method 1000 for receiving an extracted depth track image 1002 and outputting a start value and/or an end value 1004 for a depth track of the depth track image 1002. While depth track is mentioned, such a method may be employed to determine a start value and/or an end value of another type of track, which may be oriented horizontally, vertically, or in another manner.

As shown in the example of FIG. 10, the method 1000 includes a detection block 1010 for detecting text using one or more OCR engines, a filter block 1020 for filtering non-numeric text, a determination block 1030 for determining a depth per pixel value and an interpolation block 1040 for interpolating a start value and/or an end value for a track 1004 (e.g., a log) for the extracted depth track image 1002. In such an example, the start value and/or the end value may be considered extreme values or a minimum value or a maximum value. Such an approach can be utilized, for example, to associate values of a plot with respect to specific depth values, which may be or include interpolated depth values per a depth per pixel value. In such an approach, an assumption can be that a raster image is not distorted. For example, during scanning of paper documents, distortion may occur, particularly where a document feeder operates inconsistently as to speed and/or where a user may remove or otherwise move a document before a scan is completed. As an example, a method can include checking distortion by comparing portions of a depth track. For example, consider computing a depth per pixel value for a first portion of a depth track and a depth per pixel value for a second portion of a depth track where, if the values differ greater than a certain amount, the method can determine that distortion may exist. Where distortion exists, a method may employ a technique that breaks a raster image or raster tile into finer segments where multiple pixel per depth values can be utilized. Alternatively, the raster image or raster tile may be marked to indicate that distortion is greater than a certain amount.

As an example, a method can include determining whether a depth track is linear or non-linear. For example, a depth track may be given using a logarithmic scale. In such an example, an interpolation may utilize a non-linear interpolation to determine a start value and/or an end value and/or one or more intermediate values; whereas, for a linear depth track, linear interpolation may be utilized (e.g., where distortion, if existing in a raster image or tile, is less than a certain amount).

As explained, a method may utilize denoising to improve accuracy of track analysis. For example, noise may result in an OCR error as to a value or values that can carry over to a corresponding error in a depth per pixel value, which, in turn, can result in a wrong start depth value and/or a wrong end depth value.

Figure 11:
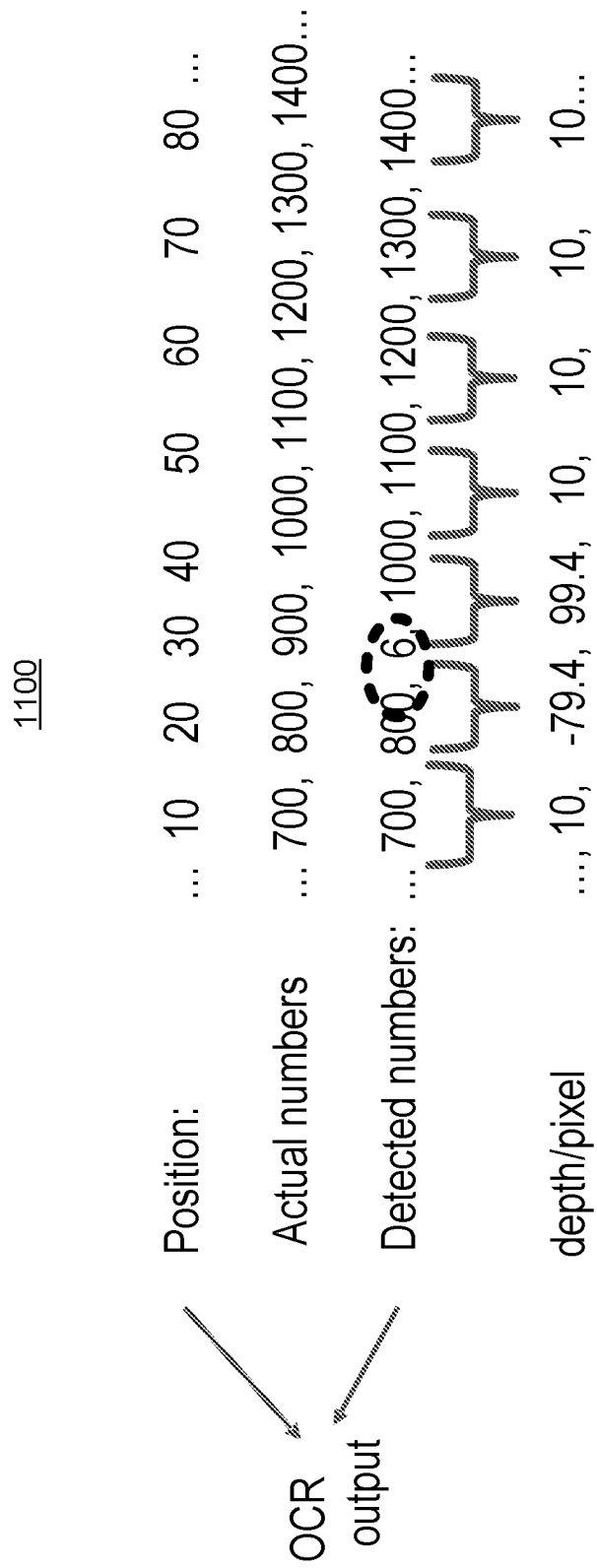
FIG. 11 illustrates an example of a method.

FIG. 11 shows an example of a method 1100 that includes detection of an error in a track value (see, e.g., dashed oval). In the example of FIG. 11, the error may be caused by an OCR result, which, in turn, generates erroneous interpolation values for depth per pixel. As shown, the value 900 is wrongly detected as 6 by an OCR engine. In such an instance, the single wrong detection can result in two wrong depth per values (see, e.g., −79.4 and 99.4, rather than 10). The selection of a pair of numbers to find the depth per pixel can become challenging in such situations which can affect the interpolation and hence start and/or end values.

Figure 12:
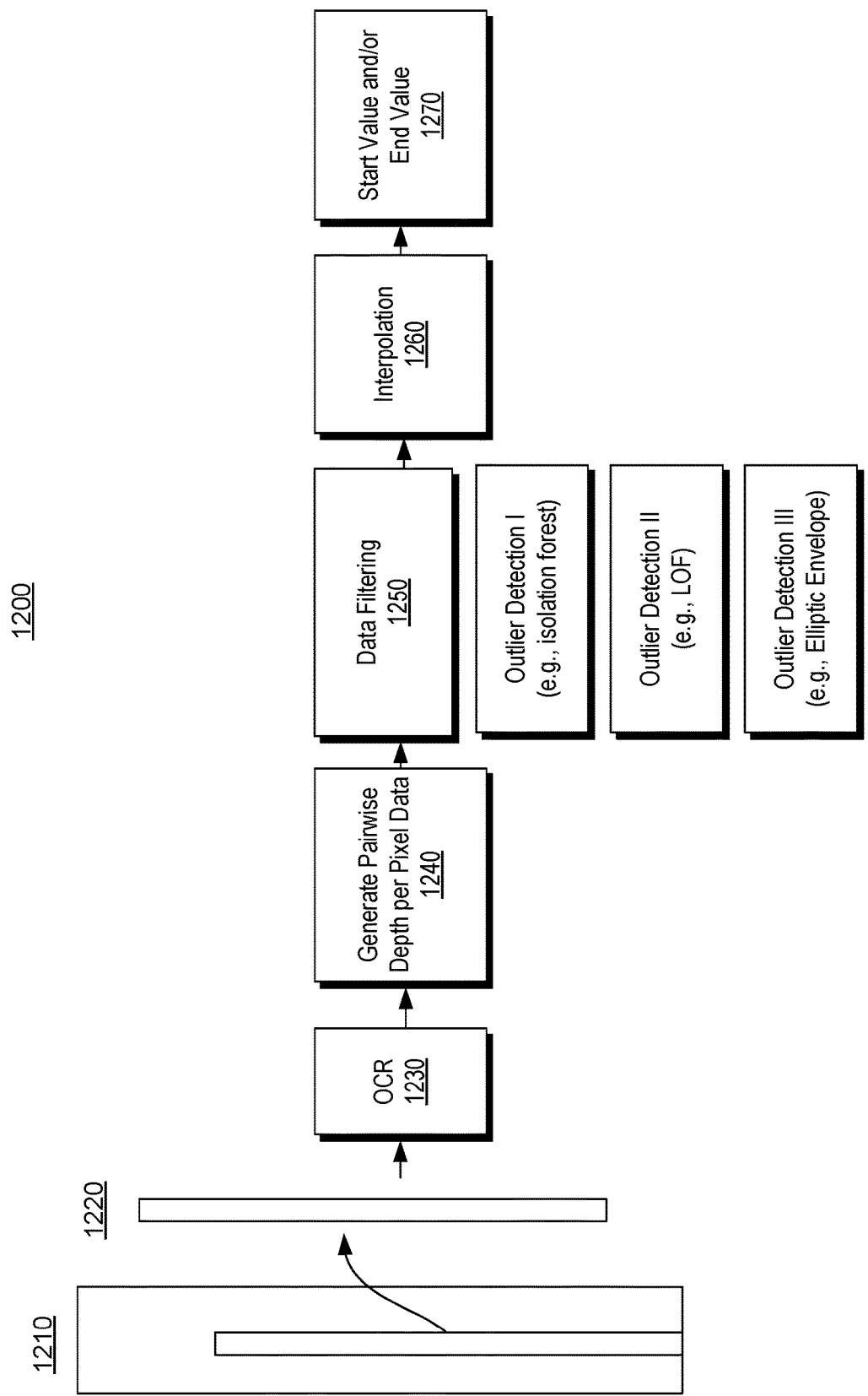
FIG. 12 illustrates an example of a method.

FIG. 12 shows an example of a method 1200 for determining one or more values 1270 from a raster image 1210. As shown, the method 1200 can receive the raster image 1210 and extract a depth track image 1220 that can be processed using one or more OCR engines 1230 to generate pairwise depth per pixel data 1240. As shown in the example of FIG. 12, the pairwise depth per pixel data 1240 can be processed using a data filtering component 1250 that can include a number of outlier detection features such as, for example, an isolation forest feature, a local outlier factor (LOF) feature and an elliptic envelope feature, to generate filtered results. The method 1200 can then perform interpolation 1260 using the filtered results to output the one or more values 1270.

The method 1100 may be utilized to determine extreme depth values from a raster document/image using OCR and ensemble of an outlier detection features.

As explained, to overcome erroneous outputs of an OCR process, an ensemble of outlier detectors can be utilized. For example, an OCR engine can be utilized to detect numbers/text in a depth track region where, based on initial filtering of non-numeric text, various values for depth per pixel can be generated using a few depth values as detected by the OCR engine. As shown in the example of FIG. 11, a depth per pixel value can be determined from two depth values which are spatially adjacent, by skipping in between one depth value, by skipping in between two depth values, etc. Based on sufficient data of depth per pixel values, as generated above, a method can use an ensemble of outlier detectors to filter out one or more erroneous depth per pixel values to thereby obtain an accurate estimation of actual depth per pixel value. For example, in FIG. 11, an accurate depth per pixel value is 10, noting that some variation may exist such that an average is not exactly 10 where an average may be rounded up or rounded down (e.g., to an integer, a decimal value, a percentage, etc.). Interpolation may be performed to determine depth at each pixel, for example, especially at a start and at an end of a depth track.

As explained, a system can be utilized to provide accurate raster segmentation by automatically extracting various raster regions and extreme depth values for a depth track in a raster document. Such a system can provide for an end-to-end raster digitization workflow, raster segmentation and depth track digitization.

As an example, a system may perform a method to automatically extract various raster regions without manual intervention where the system can include features for testing and filtering out noisy data generated by an OCR process.

As an example, a raster segmentation process can automatically segment desirable entities from document images, such as, for example, tables, figures, etc. In various instances, an entity may include or be associated with a track such as, for example, a time track, a depth track, etc. Such a track or tracks can include numeric text that can be discerned using an OCR engine. As an example, a system can be utilized in one or more workflows, applications, etc., that include numeric text where a relatively well-defined structure exists for numeric data (e.g., linearly varying depth, logarithmic varying depth, linearly varying time, logarithmic varying time, etc.). As explained, a system can also discern non-numeric text that may be of interest where a relatively well-defined structure exists for such non-numeric text or in association with such non-numeric text. As mentioned, non-numeric text may be within a header of a plot that includes or is associated with a track or tracks; noting that a header may include numeric text.

As explained, a system can provide for automatic raster image segmentation and track processing. In the case of depth track processing, a rule-based approach may be implemented to remove noisy output from an OCR engine, which, otherwise may be a tedious manual task when a substantial number of outputs from an OCR engine are noisy. As explained, an ensemble approach may be utilized for outlier detection that can be robust and efficient for removal of noisy output from an OCR engine. In such an example, an ensemble approach can provide for automated removal of noisy output from an OCR engine or OCR engines.

As an example, a system can provide for automated extraction in raster segmentation in a manner that can expedite an overall workflow for raster digitization, which can result in reduction of manual interactions and person-hours. As explained, a system may provide for automated processing without manual intervention during such automated processing. For track processing for one or more logs, a system can efficiently digitizing a track segment of a raster document where system features can provide for error detection and error handling to improve track analysis (e.g., to provide numeric metric per pixel values, etc.).

As explained, a multi-stage system may be utilized to perform at least part of an end-to-end digitization process for raster documents. For example, a two stage approach for raster segmentation may be used where high-performance is demanded and where a single stage framework does not have the capacity to deliver such performance. As explained, a multi-stage system can also include features for handling noise, which may contribute to OCR error. For example, a track processing component can be used for filtering OCR output from one or more relatively well-defined structures in a raster image and/or a raster tile. In such an example, OCR output can be subjected to outlier detection, which may implement an ensemble of outlier detectors. Such an approach can provide for an accurate determine of a track metric on a per pixel basis, whether the track is linear or non-linear. As to a non-linear track, one or more non-linear functions may be utilized that can cover a portion or portions of a track, which may include a start point and an end point. As explained, interpolation may be utilized, which can include linear interpolation and/or non-linear interpolation.

As explained, raster images can be a source of log and related information where raster segmentation can identify different raster regions, such as, for example, plot segments, tracks, and headers. As an example, a system can implement a deep learning-based supervised raster segmentation model that can be trained on a given dataset to achieve acceptable performance with high accuracy.

For raster image segmentation, various conditions can impose risks as to performance degradation. For example, performance may degrade where raster images differ substantially (e.g., dataset shift) from raster images used for training. To improve the ML model performance, a system may call for retraining on these different raster images. However, retraining can demand costly and large-scale label/annotations efforts which may take a considerable amount of time (e.g., a few days to weeks). As an example, to reduce labeling effort, a system can provide for retraining of a raster segmentation ML model through labeling of a relatively small number of header regions (e.g., log header regions, etc.). In such an example, annotations for the relatively small number of header regions along with one or more data augmentation processes (e.g., copy-paste, etc.) can address a deficit in the number of header regions utilized in initial training of the raster segmentation ML model. For example, initial training of a raster segmentation ML model can generally utilize one or more datasets that include a sufficient number of plot segments and track regions, which can provide for capturing variability in plot segments and track regions; however, variability in header regions may be limited as a single header region may be present for a number of plot segments and track regions (e.g., a one header region to many plot segments and track regions correspondence). By retraining and/or fine-tuning through a relatively small number of annotated header regions (e.g., labeled header regions), a system can effectively handle a data-imbalance stemming from prior training, which may be initial training, using data augmentation (e.g., copy-paste augmentation). A system may utilize a relatively small number of annotated header regions for generation of a larger number of synthetic header regions. In such an approach, the system can produce a relatively large amount of training data for retraining and/or fine-tuning of a deep learning-based ML model. As an example, a system can provide for generation of synthetic header regions through use of a relatively small number of labeled samples where such generation exploits structure in the data.

As an example, a system can include a label recommender component. As explained, retraining of a raster segmentation ML model for different datasets can demand time-consuming and tedious labeling efforts. Such labeling may take a few days or more depending upon dataset size (e.g., consider thousands of samples). To reduce labeling demands, a system can provide for retraining in a manner where a user labels a relatively small number of samples, such as, for example, 50 samples or less (e.g., from three to 50 samples). In such an example, the system can generate recommendations as to samples to be labeled. Such recommendations can aim to address variability in header regions, which, as explained, may be lesser in number than the number of plot segments and track regions (e.g., a data imbalance).

As an example, a system can include a structured data generation component (e.g., a structured data generator). As explained, deep learning can demand a relatively large amount of data, whether for initial training or retraining. A structured data generation component can use an available large-scale labeled dataset and a relatively small number of user labeled samples (e.g., as image tiles, etc.) from a new raster image dataset where the structured data generation component can leverage structure in raster image data.

As an example, a system can include one or more components that can be operable to improve data balance of training data and/or retraining data for training and/or retraining one or more ML models. For example, for logs as raster images, segments can include plot segments (e.g., whole or partial plots), header segments (e.g., e.g., whole or partial headers) and track segments (e.g., whole or partial tracks). In the examples of FIG. 5 and FIG. 6, the logs can be truncated logs for purposes of fitting on a single page to illustrate various portions. For example, the logs 500 of FIG. 5 may be longer with respect to the plots and the track such that the headers are a fraction of a total length of the logs 500 (e.g., consider a fraction that is less than 0.25, less than 0.1, less than 0.01, etc.). Hence, a log can include more plot and track area than header area. Thus, information germane to classification as a plot and/or classification as a track can exceed information germane to classification as a header. However, as explained, a header can be a structural element that is at a start and/or an end of a plot and at a start and/or an end of a track, whether a log is presented vertically or horizontally. As an example, a system can leverage such structure (e.g., structural organization) of logs to help address data imbalance. As explained, a system can reduce labeling efforts from one or more users by limiting labeling to header regions of raster images without demanding labeling for plot segments and track regions. Such an approach leverages the fact that a raster dataset can be imbalanced in terms of a relatively large number of regions of plot segments and track regions and a lesser number of header regions. A system can improve data balance by focusing on header regions without additional efforts of annotations for plot segment and track regions. Further, a system may recommend particular raster images and/or regions thereof for labeling to expedite a labeling process for headers.

Figure 13:
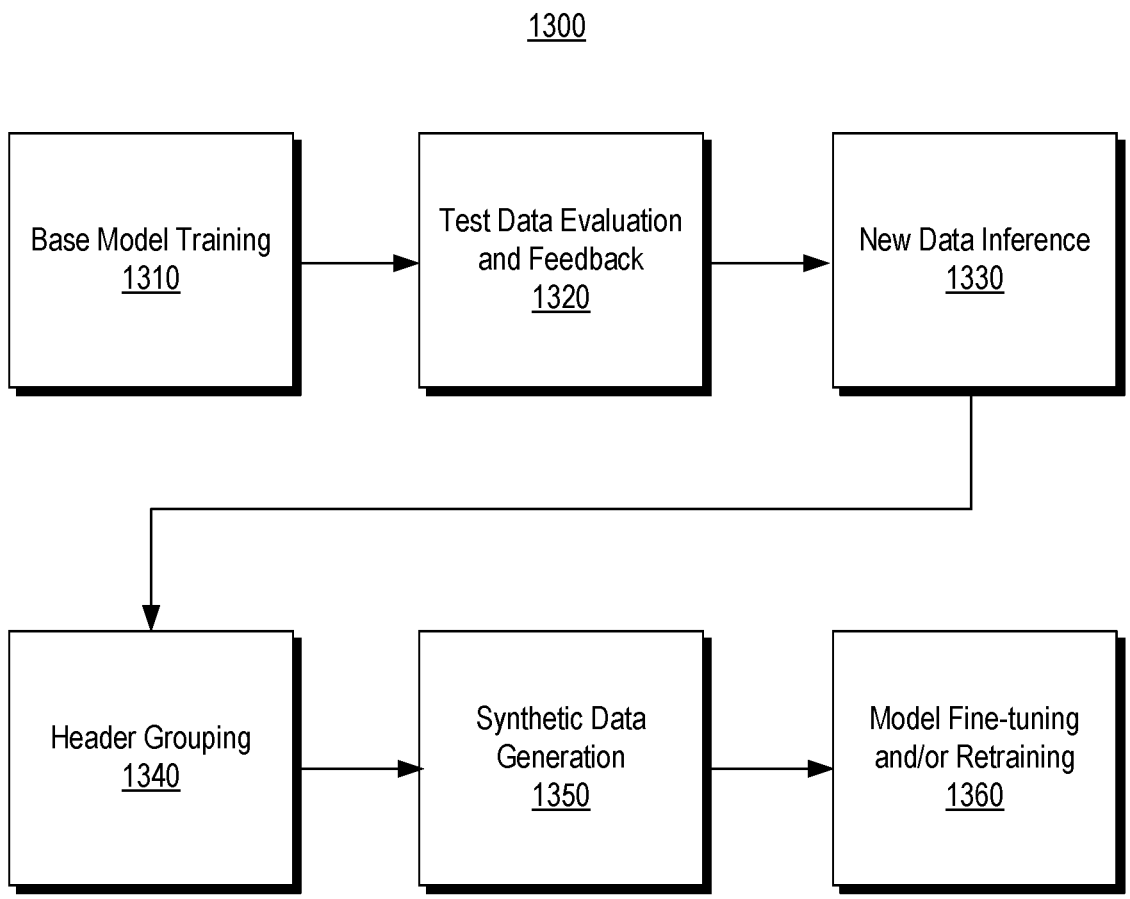
FIG. 13 illustrates an example of a method.

FIG. 13 shows an example of a method 1300 for ML model fine-tuning and/or retraining. As shown, the method 1300 can include a training block 1310 for training of a base ML model, and a test block 1320 for testing the trained base ML model using test data for evaluation and feedback. In the example of FIG. 13, additional blocks may be performed where testing proves the trained base ML model to be unacceptable in that it produces unacceptable results for one or more regions of one or more raster images. For example, where unacceptable performance is indicated, the method 1300 can include an inference block 1330 for generating inferences with new data as input using the tested and trained base ML model to extract approximate regions, which can be header regions due at least in part to variability and/or data imbalance (e.g., regions associated with unacceptable performance), a header block 1340 for performing header grouping of extracted approximate regions, a generation block 1350 for generating synthetic data, and a retraining block 1360 for fine-tuning and/or retraining of the tested and trained base ML model using at least a portion of the generated synthetic data as may leverage information from the header grouping.

Figure 14:
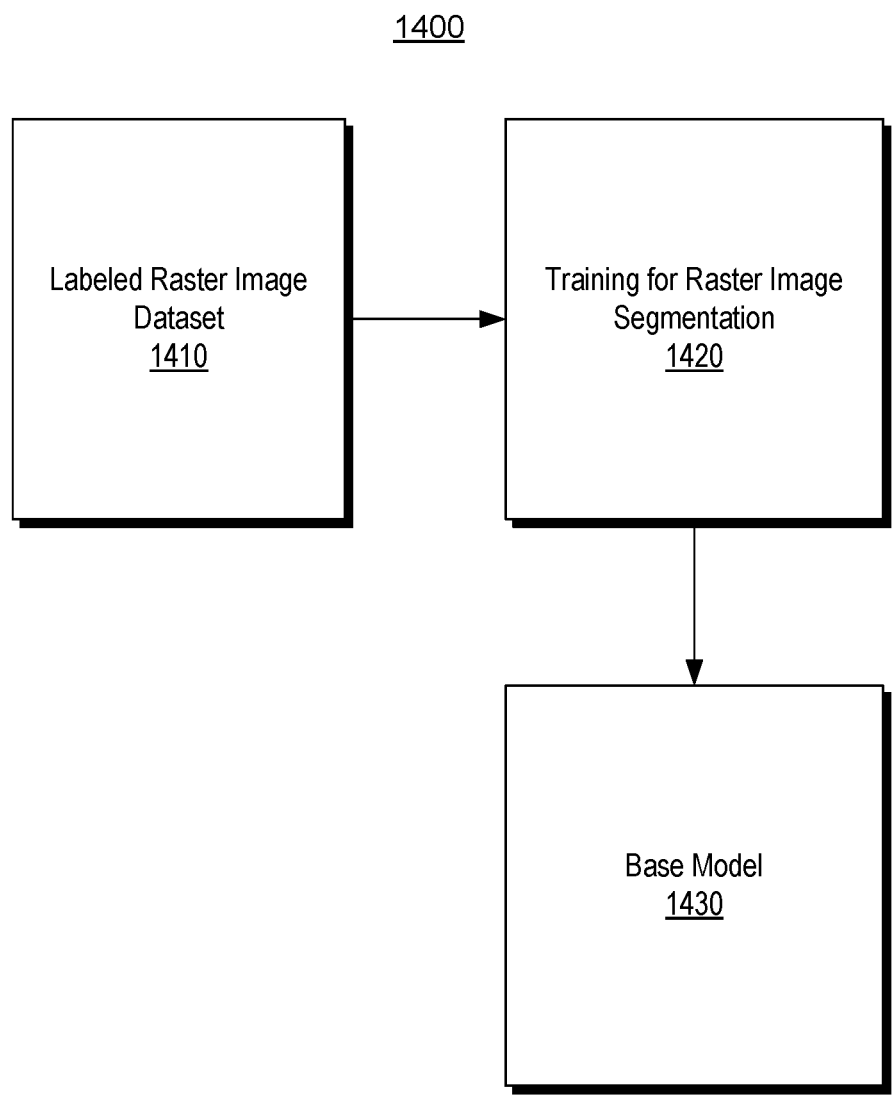
FIG. 14 illustrates an example of a process.

FIG. 14 shows an example of a base ML model training process 1400 that includes receiving a large labeled raster image dataset 1410 (e.g., dataset D1), and training for raster image segmentation 1420 to generate a trained a base ML model 1430 (e.g., model B1) for performing raster image segmentation. In various examples, a tile can be a raster image that is part of a larger raster image.

Figure 15:
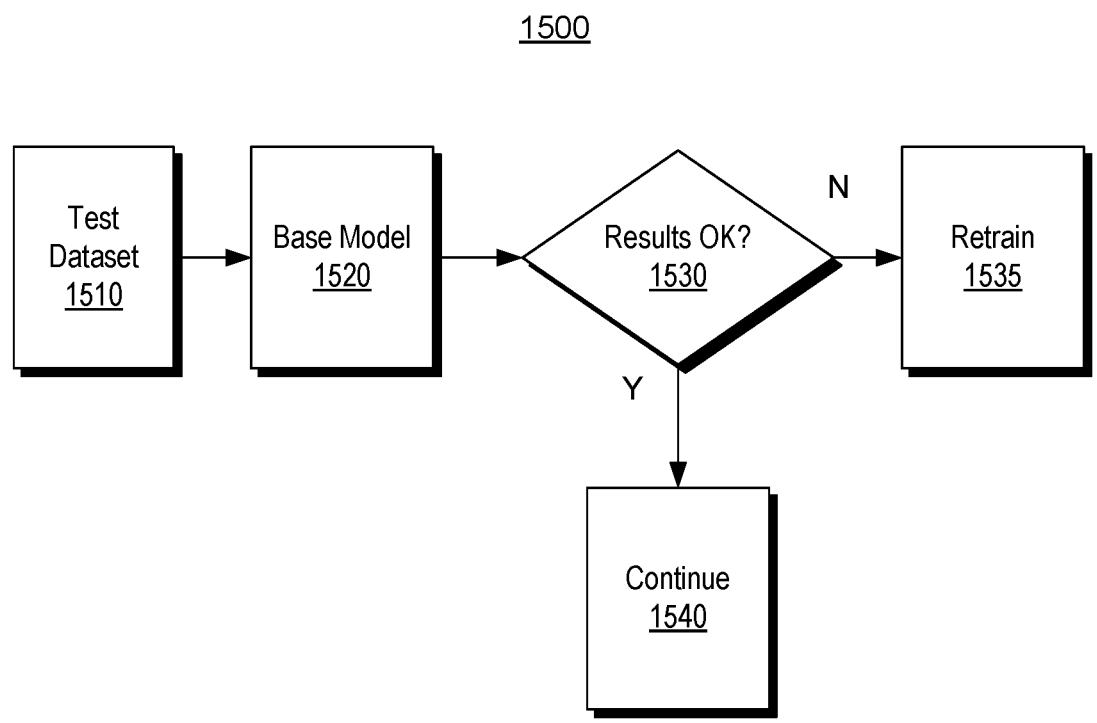
FIG. 15 illustrates an example of a process.

FIG. 15 shows an example of an evaluation process 1500 for the trained base ML model, B1. As shown, a test dataset 1510 can be received by the trained base ML model 1520 (e.g., model B1), where a human in the loop (HITL) can be utilized to assess output of the trained base ML model 1520. In such an example, the HITL can decide per a decision block 1530 whether a result is acceptable or not acceptable (e.g., results OK or not OK). Where one or more results are not acceptable (see, e.g., the no or "N" branch of the decision block 1530), the trained base ML model 1520 may be deemed inadequate and subject to additional training. In such an example, the ML model 1520 can be evaluated on test/user/client data where feedback is collected from a user/client for model performance. As shown, per a continuation block 1540 (see, e.g., the yes or "Y" branch of the decision block 1530), if the ML model 1520 does perform acceptably on the test/user/client data, then retraining/fine-tuning of the ML model 1520 may be bypassed. However, if performance of the ML model 1520 is poor as given by user/client feedback, one or more retraining components 1535 can be invoked.

Figure 16:
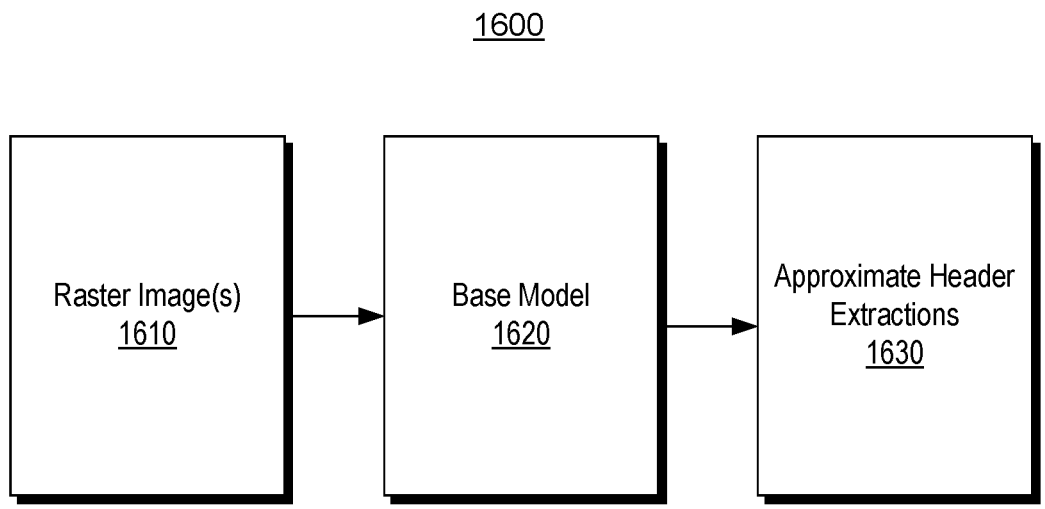
FIG. 16 illustrates an example of a process.

FIG. 16 shows an example of an inference process 1600 for the trained base ML model 1620 (e.g., B1, see also base ML models 1430 and 1520), which can be invoked responsive to a decision that the trained base ML model generates unacceptable results. For example, unacceptable results may be due to a failure to extract header regions where the header regions exhibit substantial variation. For example, a trained base ML model may demonstrate acceptable performance in extracting plot segment and track regions but fails to properly extract exact header regions due to large variations in header formats (e.g., one or more factors that result in data imbalance). In the example of FIG. 16, the inference process 1600 can utilize the trained base ML model 1620 to receive one or more raster images 1610 to extract approximate header regions 1630. Thus, approximate header regions 1630 can be an output of the inference process 1600.

Figure 17:
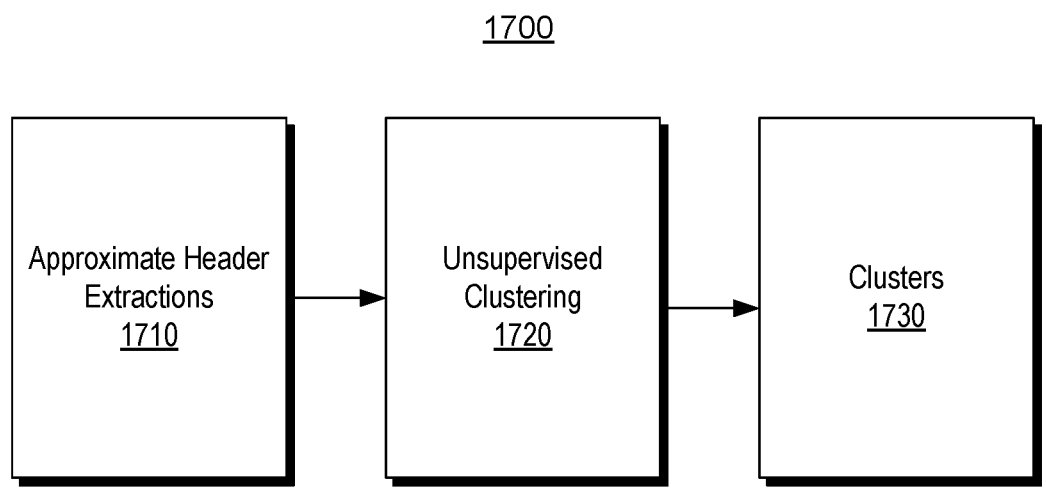
FIG. 17 illustrates an example of a process.

FIG. 17 shows an example of a grouping process 1700 that can implement unsupervised clustering on extracted approximate header regions. As shown in the example of FIG. 17, an unsupervised clustering component 1720 can receive approximate header regions 1710 to generate clusters 1730 of the extracted approximate header regions where each cluster may correspond to a different type of header format such that the clusters represent some amount of variability in headers. For example, each cluster may represent a number of the extracted approximate header regions that include similar looking header regions. In such an example, similar looking can account for similar number of rows, similar number of columns, similar aspect ratio, similar colors (e.g., if color is present), dashed lines, solid lines, etc.

Figure 18:
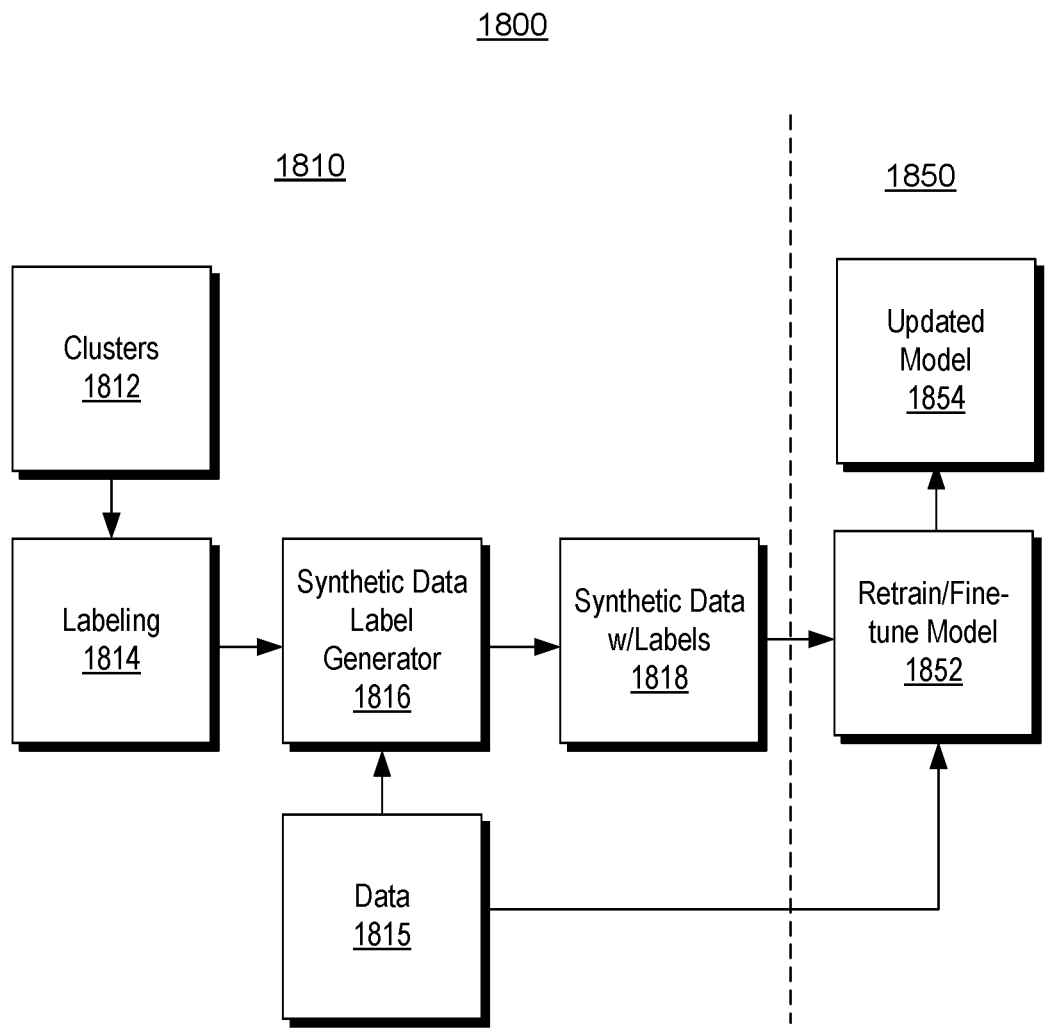
FIG. 18 illustrates examples of processes.

FIG. 18 shows examples of processes 1800 that include a synthetic data generation process 1810 and a model retraining process 1850. As shown in the example of FIG. 18, the synthetic data generation process 1810 can utilize one or more of the clusters 1812 from the grouping process 1700 of FIG. 17, which may be or include recommended types of header regions (e.g., or for one or more other parts of one or more raster images) for purposes of labeling 1814 and/or synthetic data generation 1816. As an example, in a HITL approach, from a number of the clusters, which may include each of the clusters or fewer than a total number of clusters, a relatively small number of representative images of extracted approximate header regions can be recommended for HITL annotating (see, e.g., labeling 1814). For example, consider an approach where annotating includes marking header regions with bounding boxes to generate exact labels for the header regions. Using these accurately labeled headers and a relatively large labeled dataset 1815 (e.g., dataset D1), a synthetic data label generator 1816 can create a synthetic labeled dataset 1818 (e.g., dataset D2). For example, consider a generator that generates different types of raster images by spatially arranging, in different ways, headers (e.g., relatively small in number and obtained by aforementioned user labeling), plot segments and tracks (e.g., relatively large in number and obtained from the labeled dataset D1). In such an example, the generator can use a large number of different spatial combinations of basic building blocks (e.g., plot segment, track and header) of raster images to synthetically generate a large labeled dataset (e.g., dataset D2).

As shown in the example of FIG. 18, the process 1850 can utilize the generated synthetic dataset 1818 along with the prior dataset 1815 to retrain and/or fine-tune the ML model 1852 and generate a refined ML model, which may be referred to as an updated model 1854.

Referring again to the method 1300 of FIG. 13, the process 1400 can correspond to the block 1310, the process 1500 can correspond to the block 1320, the process 1600 can correspond to the block 1330, the process 1700 can correspond to the block 1340, the process 1810 can correspond to the block 1350 and the process 1850 can correspond to the block 1360. As an example, the method 1300 may continue, optionally in an iterative manner, from the block 1360 to the block 1320 where the fine-tuned and/or retrained ML model can be tested to determine whether its performance is acceptable or unacceptable. If the method 1300 decides that the performance is unacceptable, the method 1300 can again perform actions of the blocks 1330, 1340, 1350 and 1360 until acceptable performance is achieved; noting that HITL annotating may increase in number and/or focus on a particular group or particular groups, which may be recommended.

As an example, a method can include providing a trained base ML model and then fine-tuning and/or retraining the trained base ML model for a particular task, which may be associated with a particular type of log, a particular type of downhole assembly, a particular client, etc. In such an example, a trained base ML model can be readily adapted to various tasks in an expeditious manner with minimal HITL effort.

As mentioned, the method 1300 can perform grouping per the block 1340. While unsupervised grouping, such as, for example, unsupervised clustering, is mentioned, grouping may be performed using unsupervised and/or supervised techniques, which may include semi-supervised and/or self-supervised techniques. As an example, clustering can include self-supervised clustering and/or unsupervised clustering. As an example, a k-means type of clustering may be employed where a variable k corresponds to a number of clusters where, for example, an elbow technique may be utilized to determine an appropriate value for k. Such an approach may be performed automatically in an unsupervised manner where k is determined and k clusters are output to represent an amount of variability in a class such as a header class.

In cluster analysis, the elbow technique is a heuristic that can be used in determining a number of clusters in a dataset. Such a technique can include generating data for explained variation as a function of the number of clusters and identifying an elbow of a curve as an appropriate number of clusters (e.g., a value for k). Such a technique may be used to choose a number of parameters in one or more other data-driven models, such as, for example, number of principal components to describe a dataset in a principal component analysis (PCA). As an example, one or more processes can be utilized to group and/or to identify groups or types of segments that may exhibit variability and be represented insufficiently in an unbalanced dataset.

As an example, grouping can utilize one or more features, which may include, shape, number of lines, etc. As an example, where present and consistent, color may be considered. For example, a particular client may utilize a particular color scheme consistently for certain log headers. As explained, a method can consider structure, particularly how segments are organized (e.g., plots, tracks, headers, etc.). An approach may utilize structure optionally without utilizing text. As an example, one or more boundaries of some structures may be defined by text. For example, a track may be defined in part by text, which may be numeric text, noting that, structurally, a track may be expected to be adjacent or otherwise proximate to a plot with an end that may be adjacent to or otherwise proximate to a header. Such structural features, relationships, etc., may be leveraged by a method that can segment raster images (e.g., to generate one or more masks, etc.), that can train, retrain and/or fine-tune one or more ML models, etc.

As an example, a HITL approach may consider an amount of time that it takes for a human to annotate (e.g., label) a raster image, a segment, etc. For example, consider a rate of 10 labels in one hour. As an example, a method may be adjustable based on resources. For example, where time is short and human availability limited, a method may recommend a number of samples for labeling that comports with the amount of time and the amount of human availability.

As explained, a system can implement a method that can aim to provide for time-efficient retraining for raster segmentation. In such an approach, fine-tuning can be a type of retraining. As explained, retraining generally demands considerable human resources for time consuming data annotation (e.g., labeling). A method such as, for example, the method 1300 of FIG. 13, can reduce demand for human resources, which may be in part via automation and in part by recommendation. In particular, such a method can reduce the amount of time spent on new data labeling.

As explained, demand for time consuming large-scale labeling can be reduced by providing recommendations to one or more humans for labeling a relatively small number of samples and by generating a relatively large scale labeled dataset using the relatively small number of samples. As explained, synthetic sample generation may be performed using annotated samples where the annotated samples can include annotations of samples that are recommended from a grouping process (e.g., clustering, etc.).

As mentioned, a method can provide for adapting a trained base ML model to a particular task, which may aim to process a particular type of log or types of logs. Such a method can utilize a system that provides time-efficient components for retraining of a trained base ML model (e.g., a trained raster segmentation ML model, etc.). As data from different users may differ substantially, such a system can provide a way to retrain a model whenever desired with reduced (e.g., minimal) human labeling effort. As explained, a system may be used to retrain one or more deep learning-based ML models where a sample (e.g., a raster image) can be constructed using basic building blocks (e.g., a plot segment, a track and a header).

As an example, a system can be user centric with respect to human labeling efforts where such efforts can be leveraged through structure in the data to generate a large-scale labeled dataset that includes synthetic samples.

As explained, variation and data imbalance can be factors for various types of raster image segmentation tasks (e.g., consider a relationship between imbalance and performance, etc.). In particular, as to raster images of logs, there may be substantial variations for different sources, customers, users, etc. Training a raster segmentation model on datasets that cover such variation may not be feasible at a given time, for example, due to unavailability of data. A system that includes components for retaining can be particularly useful when a raster digitization engine is to be used by different customers while not necessarily having been trained on their data. For example, consider a new customer that wants to segment raster images for purposes of digitization to access information in the raster image. Such a new customer may utilize a format that differs somewhat from formats used by old customers. In such a scenario, rather than having to train an initial ML model for the new customer, a trained ML model for the old customers may be retrained using a relatively small amount of raster images from the new customer. Such an approach can save a considerable amount of time and resources and allow for greater utility of a trained ML model (e.g., a trained base ML model). A system may provide an overall increase in productivity of a user, a customer, a provider of the system, etc.

As an example, a system may be implemented for various scenarios where data are available according to a schedule or otherwise at different times. For example, consider an approach to training and retraining where data are not available for training at the same time. In such an example, as new data become available, a retraining process may be implemented to retrain a trained ML model using the new data.

As an example, a system may be implemented for various scenarios where there exists a structure in data where a sample can be constituted using basic building blocks (e.g., a raster image can be constructed using plot, track and header regions).

As an example, a workflow can include receiving a relatively small number of labeled samples from a user, a client, etc., and retraining a trained ML model using the relatively small number of labeled samples to generate a relatively large, labeled dataset, which can effectively reduce time-consuming labeling efforts.

As to generation of a synthetic large labeled dataset, consider an article by Ghiasi et al., Simple copy-paste is a strong data augmentation method for instance segmentation. Proceedings of the IEEE/CVF Conference on Computer Vision and Pattern Recognition, 2021, which is incorporated by reference herein. In the article by Ghiasi et al., a so-called copy-paste technique is utilized to create new images for training instance segmentation models, which can include applying random scale jittering on two random training images and then randomly selecting a subset of instances from one image to paste onto the other image.

A copy-paste technique may be implemented in a manner that can lead to a combinatorial number of new training data, with multiple possibilities for: (1) choices of the pair of source image from which instances are copied, and the target image on which they are pasted; (2) choices of object instances to copy from the source image; (3) choices of where to paste the copied instances on the target image. The large variety of options when utilizing such a data augmentation method allows for exploration on how to use the technique most effectively. As explained, where raster images include segments with some amount of structure (e.g., organization), and where one or more types of segments may be underrepresented (e.g., a data imbalance), a system can provide for generation of additional raster images that can leverage the structure and increase representation of one or more types of segments in a manner whereby human effort for labeling may be reduced.

As explained, headers in raster images of logs tend to be underrepresented where variability can exist amongst such headers. As explained, grouping can be performed to assess or characterize variability, such as, for example, in the form of clusters. Given a number of groups, a system may recommend selection of members from certain groups and may, for example, recommend selection of certain members (e.g., consider members within a radius of a centroid of a cluster, etc.). As explained, for logs, headers may be a minority (e.g., a minority class) and may have substantial variation. As such, headers may be a bottleneck to log segmentation and digitization (e.g., uncovering digitized data from log plots as associated with log tracks and log headers). For logs, headers may be a minority class and plots and tracks a majority class or majority classes. In such an example, headers can be underrepresented. As explained, various techniques can provide for robust mask generation for log headers even though log headers are a minority class (e.g., underrepresented in raster images).

FIG. 19 shows an example of a method 1900 and an example of a system 1990. As shown, the method 1900 can include a reception block 1910 for receiving raster images of logs, where the logs include plots, tracks and headers and where, compared to the plots and the tracks, the headers are underrepresented; a processing block 1920 for processing the raster images using a trained machine learning model to generate segmentation masks for the logs for identification of the plots, the tracks and the headers; and a generation block 1930 for generating digitized versions of the logs using the segmentation masks, where each of the digitized versions of the logs includes a digitized plot with an associated digitized header and an associated digitized track.

The method 1900 is shown in FIG. 19 in association with various computer-readable media (CRM) blocks 1911, 1921 and 1931. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1900. As an example, a computer-readable medium (CRM) may be a computer-readable storage medium that is non-transitory and that is not a carrier wave. As an example, one or more of the blocks 1911, 1921 and 1931 may be in the form processor-executable instructions.

In the example of FIG. 19, the system 1990 includes one or more information storage devices 1991, one or more computers 1992, one or more networks 1995 and instructions 1996. As to the one or more computers 1992, each computer may include one or more processors (e.g., or processing cores) 1993 and memory 1994 for storing the instructions 1996, for example, executable by at least one of the one or more processors 1993 (see, e.g., the blocks 1911, 1921 and 1931). As an example, a computer may include one or more network interfaces (e.g., wired or wireless), one or more graphics cards, a display interface (e.g., wired or wireless), etc.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, backpropagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms. TENSORFLOW computations can be expressed as stateful dataflow graphs; noting that the name TENSORFLOW derives from the operations that such neural networks perform on multidimensional data arrays. Such arrays can be referred to as "tensors".

As an example, a device may utilize TENSORFLOW LITE (TFL) or another type of lightweight framework. TFL is a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). Multiple platform support, covering ANDROID and iOS devices, embedded LINUX, and microcontrollers. Diverse language support, which includes JAVA, SWIFT, Objective-C, C++, and PYTHON. High performance, with hardware acceleration and model optimization. Machine learning tasks may include, for example, image classification, object detection, pose estimation, question answering, text classification, etc., on multiple platforms.

As an example, a log scanner (e.g., a scanning machine for scanning paper with indicia, markings, etc.) may include features suitable for implementation of a framework such as, for example, the TFL framework. In such an example, the log scanner may perform various tasks that can provide for scanning paper logs and output digitized logs where, for example, one or more tracks are characterized on a metric per pixel basis (e.g., depth per pixel, time per pixel, etc.).

As an example, a method can include receiving raster images of logs, where the logs include plots, tracks and headers and where, compared to the plots and the tracks, the headers are underrepresented; processing the raster images using a trained machine learning model to generate segmentation masks for the logs for identification of the plots, the tracks and the headers; and generating digitized versions of the logs, where each of the digitized versions of the logs includes a digitized plot with an associated digitized header and an associated digitized track. In such an example, a track can include one or more scales such as, for example, a depth scale and/or a time scale, and, for example, a header can include one or more scales such as, for example, a scale as to a measured numeric value, a percentage, a fraction, etc. As explained, a track may serve more than one plot and may serve more than one header. As an example, a digitized track can be a track that has been processed to determine a metric per distance value such as, for example, a metric per pixel value (see, e.g., the example of FIG. 8).

As an example, a digitized header can be a header with a digital footprint, which may be defined by one or more masks. As an example, a digitized plot can be a plot with a digital footprint, which may be defined by one or more masks. As an example, a digitized track can be a track with a digital footprint, which may be defined by one or more masks. As an example, a digitized log can be a log that is defined by one or more masks where such one or more masks are generated digitally based at least in part on information within a raster image or raster images of the log.

As an example, a digitized version of a log may be utilized to generate values from one or more plots that correspond to values from one or more tracks and/or one or more headers. For example, consider a value for a sensor-based measurement at a particular depth value, which may be stored as a duple. As an example, where a plot includes multiple types of information, a duple, a triple, etc., may be generated and stored. For example, consider values for multiple sensor-based measurements at a particular depth value, which may be stored using a suitable data structure (e.g., a vector, etc.). As an example, one or more levels of digitization may be applied to a raster image of a log. As explained, levels of digitization can involve levels of masks, which may be determined using multiple stages of processing (e.g., a first stage and a second stage as in the example of FIG. 9; noting that one or more additional stages may be applied).

As an example, a method can include performing optical character recognition on one of the tracks to discern numerical values and/or one of the headers to discern numerical values. As an example, an approach taken for a track may be applied to a header. For example, a track can include a scale and a header can include a scale.

As an example, a method can include determining a numerical increment per pixel value for one or more tracks (e.g., scales). As an example, a method can include determining at least one extreme value for a track (e.g., a scale) based at least in part on a numerical increment per pixel value. In such an example, at least one extreme value can include a start value, an end value or a start value and an end value. As an example, for some types of scales, a value may be a mid-point value such as a null value where values can be negative to one side and positive to another side.

As an example, a track (e.g., a scale) may be linear or it may be nonlinear. As an example, a nonlinear track (e.g., scale) may be logarithmic or another type of nonlinear track.

As an example, a method can include performing a quality control process on numerical values to identify one or more erroneous numerical values. In such an example, the quality control process can utilize multiple outlier detection techniques.

As an example, a method can include processing raster images using a first stage and a second stage. In such an example, the first stage can utilize a single classification process for plots, tracks and headers and the second stage can utilize a single classifications process for plots and another single classification process for headers. As explained, in some instances, headers may be processed using a process akin to a track process whereby one or more scales may be discerned, which may be utilized for one or more purposes. As explained, a multiple class problem may be broken down into problems with a smaller number of classes, which can include, for example, one or more two class problems. As explained, in various instances, a two class segmentation process may be more robust and accurate than a segmentation process for more than two classes (see, e.g., the example of FIG. 9).

As an example, tracks can include depth tracks and/or time tracks. As explained, a single track may serve multiple plots (see, e.g., the example of FIG. 8). As explained, a header may include one scale or multiple scales. For example, consider the raster image 714 of FIG. 7, where one or more of the headers includes multiple scales (e.g., gamma, caliper, collar locator, etc.). In such an example, one or more of solid lines, dashed lines, dotted lines, colored lines, line thicknesses, etc., may be utilized to distinguish different data that appears in a plot or plots. As an example, a method can include distinguishing different types of lines and, for example, one or more numerals, which may correspond to one or more extremes of a scale or scales that appear in a header. As an example, a metric per pixel may be determined for a scale or a number of scales. Where scales in a header have a common dimension (e.g., width), a distance per pixel may be utilized in determining a metric per pixel for each of the scales given, for example, extreme values for the scales.

As an example, a log can be a downhole assembly log acquired by a downhole assembly (e.g., a downhole tool that includes one or more types of sensors, etc.). As an example, logs can include downhole assembly logs as acquired by one or more downhole assemblies.

As an example, a method can include training a machine learning model to generate a trained machine learning model. As an example, a method can include testing a trained machine learning model for making a decision as to acceptable performance or unacceptable performance. In such an example, responsive to unacceptable performance, a method can include generating labeled synthetic data and retraining a trained machine learning model using the labeled synthetic data. As an example, a method can include generating synthetic data, for example, by grouping headers to generate groups, labeling at least one header from at least one of the groups, and replicating the at least one header a number of times to generate at least a portion of labeled synthetic data. In such an example, grouping can include clustering, where each group of a number of groups is an individual cluster.

As an example, a system can include one or more processors; memory accessible to at least one of the one or more processors; processor-executable instructions stored in the memory and executable to instruct the system to: receive raster images of logs, where the logs include plots, tracks and headers and where, compared to the plots and the tracks, the headers are underrepresented; process the raster images using a trained machine learning model to generate segmentation masks for the logs for identification of the plots, the tracks and the headers; and generate digitized versions of the logs, where each of the digitized versions of the logs includes a digitized plot with an associated digitized header and an associated digitized track.

As an example, one or more computer-readable storage media can include processor-executable instructions to instruct a computing system to: receive raster images of logs, where the logs include plots, tracks and headers and where, compared to the plots and the tracks, the headers are underrepresented; process the raster images using a trained machine learning model to generate segmentation masks for the logs for identification of the plots, the tracks and the headers; and generate digitized versions of the logs using the segmentation masks, where each of the digitized versions of the logs includes a digitized plot with an associated digitized header and an associated digitized track.

As an example, a computer program product can include one or more computer-readable storage media that can include processor-executable instructions to instruct a computing system to perform one or more methods and/or one or more portions of a method.

Figure 20:
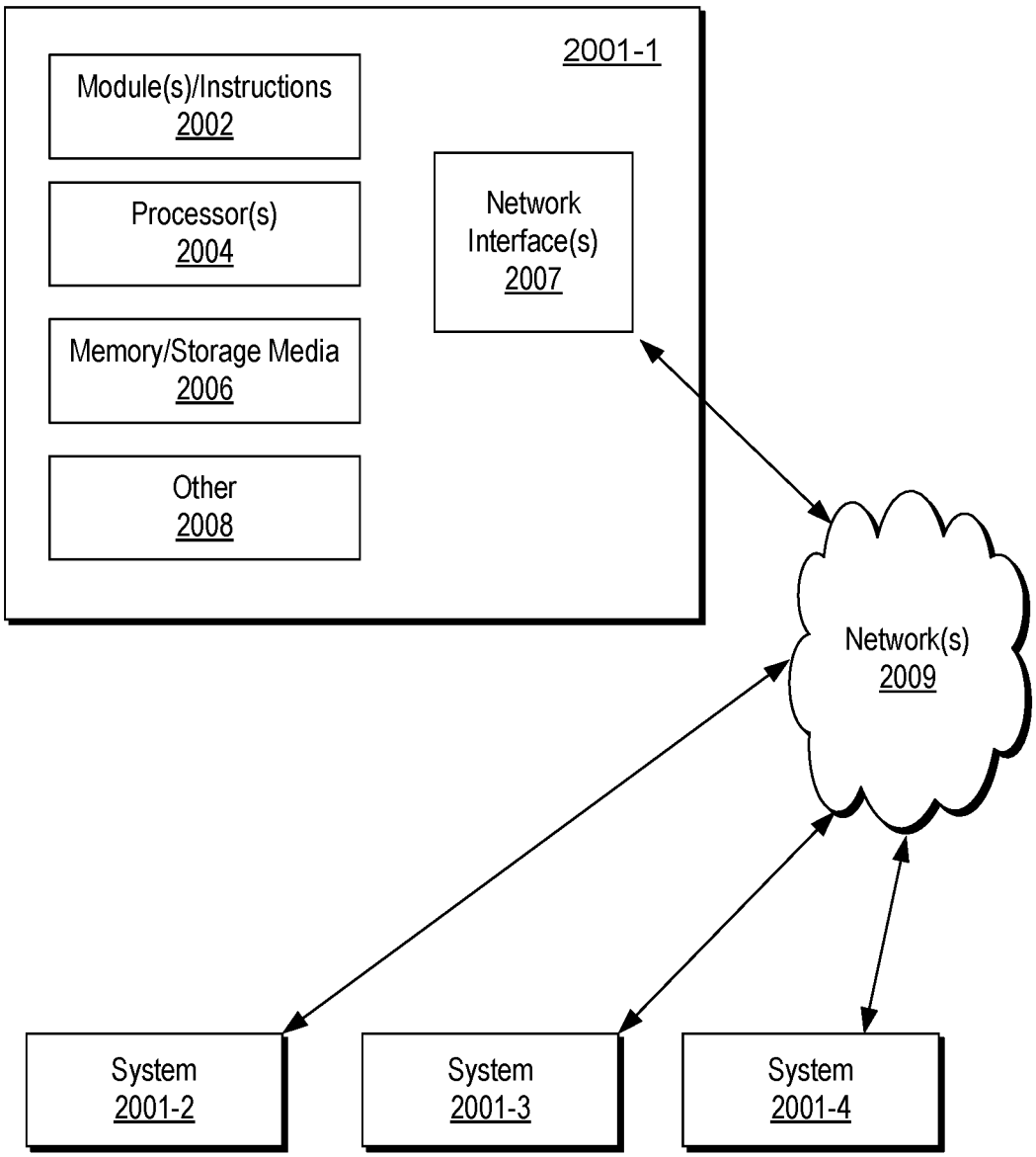
FIG. 20 illustrates examples of computer and network equipment.

In some embodiments, a method or methods may be executed by a computing system. FIG. 20 shows an example of a system 2000 that can include one or more computing systems 2001-1, 2001-2, 2001-3 and 2001-4, which may be operatively coupled via one or more networks 2009, which may include wired and/or wireless networks.

As an example, a system can include an individual computer system or an arrangement of distributed computer systems. In the example of FIG. 20, the computer system 2001-1 can include one or more modules 2002, which may be or include processor-executable instructions, for example, executable to perform various tasks (e.g., receiving information, requesting information, processing information, simulation, outputting information, etc.).

As an example, a module may be executed independently, or in coordination with, one or more processors 2004, which is (or are) operatively coupled to one or more storage media 2006 (e.g., via wire, wirelessly, etc.). As an example, one or more of the one or more processors 2004 can be operatively coupled to at least one of one or more network interfaces 2007; noting that one or more other components 2008 may also be included. In such an example, the computer system 2001-1 can transmit and/or receive information, for example, via the one or more networks 2009 (e.g., consider one or more of the Internet, a private network, a cellular network, a satellite network, etc.).

As an example, the computer system 2001-1 may receive from and/or transmit information to one or more other devices, which may be or include, for example, one or more of the computer systems 2001-2, etc. A device may be located in a physical location that differs from that of the computer system 2001-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution. As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
receiving raster images of downhole assembly logs comprising well information, wherein the downhole assembly logs comprise plots, tracks and headers and wherein, compared to the plots and the tracks, the headers are underrepresented;
processing the raster images using a trained machine learning model to generate segmentation masks for the downhole assembly logs for identification of the plots, the tracks and the headers;
adjusting the trained machine learning model using labeled synthetic data, wherein the labeled synthetic data comprises synthetic downhole assembly logs, and the labeled synthetic data is generated by grouping headers to generate groups, labeling at least one header from at least one of the groups, and replicating the at least one header; and
generating digitized versions of the downhole assembly logs, wherein each of the digitized versions of the downhole assembly logs comprises a digitized plot with an associated digitized header and an associated digitized track.

2. The method of claim 1, comprising performing optical character recognition on one of the tracks to discern numerical values.

3. The method of claim 2, comprising determining a numerical increment per pixel value for the one of the tracks.

4. The method of claim 3, comprising determining at least one extreme value for the track based at least in part on the numerical increment per pixel value.

5. The method of claim 4, wherein the at least one extreme value comprises a start value, an end value, or a start value and an end value.

6. The method of claim 2, wherein the one of the tracks is linear.

7. The method of claim 2, comprising performing a quality control process on the numerical values to identify one or more erroneous numerical values.

8. The method of claim 7, wherein the quality control process utilizes multiple outlier detection techniques.

9. The method of claim 1, wherein processing the raster images comprises a first stage and a second stage.

10. The method of claim 9, wherein the first stage utilizes a single classification process for plots, tracks and headers and wherein the second stage utilizes a single classification process for plots and another single classification process for headers.

11. The method of claim 1, wherein the tracks comprise depth tracks.

12. The method of claim 1, wherein the tracks comprise time tracks.

13. The method of claim 1, wherein the logs comprise downhole assembly logs are acquired by one or more downhole assemblies.

14. The method of claim 1, comprising training a machine learning model to generate the trained machine learning model.

15. The method of claim 1, comprising testing the trained machine learning model for making a decision as to acceptable performance or unacceptable performance.

16. The method of claim 15, wherein the labeled synthetic data is generated in response to the decision as to unacceptable performance.

17. The method of claim 1, wherein grouping comprises clustering, wherein each of the groups is an individual cluster.

18. The method of claim 1, wherein adjusting the trained machine learning model comprises retraining or fine tuning the trained machine learning model based on the labeled synthetic data.

19. A system comprising:
one or more processors;
memory accessible to at least one of the one or more processors;
processor-executable instructions stored in the memory and executable to instruct the system to:
receive raster images of downhole assembly logs comprising well information, wherein the downhole assembly logs comprise plots, tracks and headers and wherein, compared to the plots and the tracks, the headers are underrepresented;
process the raster images using a trained machine learning model to generate segmentation masks for the downhole assembly logs for identification of the plots, the tracks and the headers;
adjust the trained machine learning model using labeled synthetic data, wherein the labeled synthetic data comprises synthetic downhole assembly logs, and the labeled synthetic data is generated by grouping headers to generate groups, labeling at least one header from at least one of the groups, and replicating the at least one header; and
generate digitized versions of the downhole assembly logs, wherein each of the digitized versions of the downhole assembly logs comprises a digitized plot with an associated digitized header and an associated digitized track.

20. A non-transitory, computer readable medium comprising instructions that, when executed by processing circuitry, cause the processing circuitry to perform operations comprising:

receiving raster images of downhole assembly logs comprising well information, wherein the downhole assembly logs comprise plots, tracks and headers and wherein, compared to the plots and the tracks, the headers are underrepresented;

processing the raster images using a trained machine learning model to generate segmentation masks for the downhole assembly logs for identification of the plots, the tracks and the headers;

adjusting the trained machine learning model using labeled synthetic data, wherein the labeled synthetic data comprises synthetic downhole assembly logs, and the labeled synthetic data is generated by grouping headers to generate groups, labeling at least one header from at least one of the groups, and replicating the at least one header; and generating digitized versions of the downhole assembly logs using the segmentation masks, wherein each of the digitized versions of the downhole assembly logs comprises a digitized plot with an associated digitized header and an associated digitized track.

\* \* \* \* \*